(12) United States Patent
Fan et al.

(10) Patent No.: US 7,987,403 B2
(45) Date of Patent: Jul. 26, 2011

(54) METHOD AND APPARATUS FOR ENCODING FEEDBACK SIGNAL

(75) Inventors: Shuju Fan, Shenzhen (CN); Jing Li, Shenzhen (CN); Xueli Ma, Shenzhen (CN); Zongjie Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/980,451

(22) Filed: Dec. 29, 2010

(65) Prior Publication Data

US 2011/0087945 A1  Apr. 14, 2011

Related U.S. Application Data

(63) Continuation of application No. PCT/CN2009/070846, filed on Mar. 17, 2009.

(51) Int. Cl.
*H04L 1/18* (2006.01)
(52) U.S. Cl. .................. 714/749; 714/774
(58) Field of Classification Search .............. 714/749, 714/774
See application file for complete search history.

(56) References Cited

U.S. PATENT DOCUMENTS

| | | | | |
|---|---|---|---|---|
| 7,693,125 | B2 * | 4/2010 | Ihm et al. | 370/343 |
| 7,764,727 | B2 * | 7/2010 | Ye et al. | 375/150 |
| 7,778,197 | B2 * | 8/2010 | Kim | 714/790 |
| 2006/0036922 | A1 * | 2/2006 | Hong et al. | 714/748 |
| 2006/0074612 | A1 * | 4/2006 | Kent et al. | 703/2 |
| 2008/0086669 | A1 | 4/2008 | Cheng et al. | |
| 2009/0040970 | A1 * | 2/2009 | Ahmadi et al. | 370/329 |

FOREIGN PATENT DOCUMENTS

| | | |
|---|---|---|
| CN | 101222304 A | 7/2008 |
| CN | 101340715 A | 1/2009 |
| CN | 101383684 A | 3/2009 |
| WO | WO 2008/153361 A1 | 12/2008 |

OTHER PUBLICATIONS

"HS-DPCCH design framework for MC-HSDPA—R1-090034," 3GPP TSG RAN WG1 Meeting #55bis, Jan. 12-16, 2009, Ljubljana, Slovenia.
International Search Report in corresponding PCT Application No. PCT/CN2009/070846 (Dec. 17, 2009).
"3GPP TS 25.212—Technical Specification Group Radio Access Network; Multiplexing and channel coding (FDD) (Release 8)," Dec. 2008, Version 8.4.0, 3rd Generation Partnership Project, Valbonne, France.

* cited by examiner

*Primary Examiner* — M. Mujtaba K Chaudry
(74) *Attorney, Agent, or Firm* — Leydig, Voit & Mayer, Ltd.

(57) ABSTRACT

A method and apparatus for encoding feedback signals is provided. The method includes: encoding feedback signals of three carriers to output a bit sequence; and transmitting the bit sequence on a High Speed-Dedicated Physical Control Channel (HS-DPCCH). The step of encoding the feedback signals of the three carriers may specifically include: mapping the feedback signals of the three carriers into a codeword, in which the codeword can be selected from a codebook, and codewords in the codebook satisfy a particular code distance relationship. The method for jointly encoding feedback signals of three carriers in a Ternary Cell (TC) mode is provided. Feedback signals are transmitted over a single code channel. Therefore, power overhead is reduced, and system performance is improved.

6 Claims, 1 Drawing Sheet

METHOD AND APPARATUS FOR ENCODING FEEDBACK SIGNAL

CROSS-REFERENCE TO RELATED APPLICATION

This application is a continuation of International Application No. PCT/CN2009/070846, filed on Mar. 17, 2009, which is hereby incorporated by reference in its entirety.

FIELD OF THE INVENTION

The present invention relates to the field of communication technologies, and in particular, to a method and apparatus for encoding feedback signal.

BACKGROUND OF THE INVENTION

In a physical layer hybrid automatic repeat request (HARQ) procedure, a User Equipment (UE) monitors a High Speed-Shared Control Channel (HS-SCCH). If no data is received, the UE has no action, which can be understood that: the UE does not transmit information to a base station (a Node B), and in this case, feedback information acquired by the Node B is Discontinuous Transmission (DTX) information. If data is received, data on a High Speed-Downlink Shared Channel (HS-DSCH) is detected according to control channel information. If the received data is correct, acknowledgement (ACK) information is transmitted to the Node B; if the received data is incorrect, negative acknowledgement (NACK) information is transmitted to the Node B. The DTX, ACK, and NACK information are uniformly referred to as hybrid automatic repeat request-acknowledgement (HARQ-ACK) information. After being encoded, the HARQ-ACK information is further transmitted to the Node B through an uplink High Speed-Dedicated Physical Control Channel (HS-DPCCH). The Node B receives and translates the feedback information. If the feedback information is ACK, new data is transmitted; if the feedback information is NACK, the data is re-transmitted; if the feedback information is DTX, the new data is re-transmitted.

In the Third Generation Partnership Project (3GPP) standards, a Dual Carrier-High Speed Downlink Packet Access (DC-HSDPA) technology is introduced for improving user experience. Based on the technology, several HARQ-ACK encoding solutions are provided in the prior art, and are specifically illustrated as follows.

In the Release 5 (R5) version of 3GPP TS25.212, a single-carrier encoding solution is provided. In this case, a total of three feedback signals are required to be transmitted, namely, ACK, NACK, and DTX, in which ACK and NACK are required to use codewords, as shown in Table 1-1:

TABLE 1-1

Single-Carrier HARQ-ACK Encoding Solution

| ACK | 1 | 1 | 1 | 1 | 1 | 1 | 1 | 1 | 1 | 1 |
|---|---|---|---|---|---|---|---|---|---|---|
| NACK | 0 | 0 | 0 | 0 | 0 | 0 | 0 | 0 | 0 | 0 |

In the Release 8 (R8) version of the 3GPP TS25.212, a dual-carrier encoding solution is provided, and the solution requires nine feedback signals, in which eight codewords are used (DTX does not use any codeword), as shown in Table 1-2:

TABLE 1-2

Dual-Carrier HARQ-ACK Encoding Solution

The UE only detects data block on a primary carrier.

| ACK | 1 | 1 | 1 | 1 | 1 | 1 | 1 | 1 | 1 | 1 |
|---|---|---|---|---|---|---|---|---|---|---|
| NACK | 0 | 0 | 0 | 0 | 0 | 0 | 0 | 0 | 0 | 0 |

The UE only detects a data block on an secondary carrier.

| ACK | 1 | 1 | 1 | 1 | 1 | 0 | 0 | 0 | 0 | 0 |
|---|---|---|---|---|---|---|---|---|---|---|
| NACK | 0 | 0 | 0 | 0 | 0 | 1 | 1 | 1 | 1 | 1 |

The UE detects data blocks on both of primary and secondary carriers.

| Primary carrier feedback signal | Secondary carrier feedback signal | | | | | | | | | |
|---|---|---|---|---|---|---|---|---|---|---|
| ACK | ACK | 1 | 0 | 1 | 0 | 1 | 0 | 1 | 0 | 1 | 0 |
| ACK | NACK | 1 | 1 | 0 | 0 | 1 | 1 | 0 | 0 | 1 | 1 |
| NACK | ACK | 0 | 0 | 1 | 1 | 0 | 0 | 1 | 1 | 0 | 0 |
| NACK | NACK | 0 | 1 | 0 | 1 | 0 | 1 | 0 | 1 | 0 | 1 |

Currently, researches about Ternary Cell (TC) technologies have not been started yet, and the inventors find by studying the prior art that: if the prior art is adopted to solve the feedback problem in TC, the most direct method is to adopt three code channels, each carrier uses one code channel, and then the encoding solution as shown in Table 1-1 is adopted; or two code channels are adopted. One carrier uses the encoding solution as shown in Table 1-1, and the other two carriers use the encoding solution as shown in Table 1-2. Disadvantages of the two methods lie in that, excessive power is required to be consumed, the generally consumed power is 2 to 3 times of that for the single carrier, and a system Cubic Metric (CM) value is increased, thus affecting the system performance.

SUMMARY OF THE INVENTION

The embodiments of the present invention provide methods and apparatuses for encoding feedback signals to implement that feedback signals of three carriers are encoded with a single code channel.

In an embodiment, the present invention provides a method for encoding feedback signals. The method may include:

encoding feedback signals of three carriers to output a bit sequence; and transmitting the bit sequence on an uplink HS-DPCCH, in which the encoding the feedback signals of the three carriers includes: mapping the feedback signals of the three carriers into a codeword selected from a codebook, in which the codebook comprises codewords G1 to G16 and H1 to H10, in which code distance relationships of the codewords in the codebook are as shown in Table 1-3:

TABLE 1-3

|  | G1 | G2 | G3 | G4 | G5 | G6 | G7 | G8 | G9 | G10 | G11 | G12 | G13 | G14 | G15 | G16 | H1 | H2 | H3 | H4 | H5 | H6 | H7 | H8 | H9 | H10 |
|---|---|---|---|---|---|---|---|---|---|---|---|---|---|---|---|---|---|---|---|---|---|---|---|---|---|---|
| G1 | 0 | 6 | 6 | 6 | 6 | 4 | 6 | 4 | 6 | 4 | 6 | 6 | 6 | 4 | 4 | 4 | 10 | 4 | 4 | 4 | 4 | 6 | 4 | 6 | 4 | 6 |
| G2 | 6 | 0 | 6 | 6 | 6 | 4 | 4 | 6 | 4 | 6 | 6 | 6 | 4 | 6 | 4 | 4 | 4 | 10 | 4 | 4 | 4 | 6 | 6 | 4 | 6 | 4 |
| G3 | 6 | 6 | 0 | 6 | 4 | 6 | 6 | 4 | 6 | 6 | 6 | 6 | 4 | 4 | 6 | 4 | 4 | 4 | 10 | 4 | 6 | 4 | 4 | 6 | 6 | 4 |
| G4 | 6 | 6 | 6 | 0 | 4 | 6 | 4 | 6 | 6 | 4 | 6 | 6 | 4 | 4 | 4 | 6 | 4 | 4 | 4 | 10 | 6 | 4 | 6 | 4 | 4 | 6 |
| G5 | 6 | 6 | 4 | 4 | 0 | 4 | 6 | 6 | 6 | 6 | 6 | 4 | 6 | 6 | 4 | 4 | 4 | 4 | 6 | 6 | 10 | 6 | 4 | 4 | 4 | 4 |
| G6 | 4 | 4 | 6 | 6 | 4 | 0 | 6 | 6 | 6 | 6 | 4 | 4 | 4 | 6 | 6 | 6 | 6 | 6 | 4 | 4 | 6 | 10 | 4 | 4 | 4 | 4 |
| G7 | 6 | 4 | 6 | 4 | 6 | 6 | 0 | 4 | 6 | 6 | 6 | 4 | 6 | 4 | 6 | 4 | 4 | 6 | 4 | 6 | 4 | 4 | 10 | 6 | 4 | 4 |
| G8 | 4 | 6 | 4 | 6 | 6 | 6 | 4 | 0 | 6 | 6 | 6 | 4 | 4 | 6 | 4 | 6 | 6 | 4 | 6 | 4 | 4 | 4 | 6 | 10 | 4 | 4 |
| G9 | 6 | 4 | 6 | 6 | 6 | 6 | 6 | 6 | 0 | 4 | 6 | 4 | 6 | 4 | 6 | 4 | 6 | 6 | 4 | 4 | 4 | 4 | 4 | 4 | 10 | 6 |
| G10 | 4 | 6 | 6 | 4 | 6 | 6 | 6 | 6 | 4 | 0 | 6 | 4 | 4 | 6 | 4 | 6 | 6 | 4 | 6 | 4 | 4 | 4 | 4 | 4 | 6 | 10 |
| G11 | 6 | 6 | 6 | 6 | 6 | 4 | 6 | 6 | 6 | 6 | 0 | 6 | 4 | 6 | 6 | 4 | 4 | 4 | 4 | 4 | 4 | 4 | 4 | 4 | 4 | 4 |
| G12 | 6 | 6 | 6 | 6 | 4 | 4 | 4 | 4 | 4 | 4 | 6 | 0 | 6 | 6 | 6 | 6 | 4 | 4 | 4 | 4 | 6 | 6 | 6 | 6 | 6 | 6 |
| G13 | 6 | 4 | 4 | 4 | 6 | 4 | 6 | 4 | 6 | 4 | 4 | 6 | 0 | 6 | 6 | 6 | 4 | 6 | 6 | 6 | 4 | 6 | 4 | 6 | 4 | 6 |
| G14 | 4 | 6 | 4 | 4 | 6 | 6 | 4 | 6 | 4 | 6 | 6 | 6 | 6 | 0 | 6 | 6 | 6 | 4 | 6 | 6 | 4 | 6 | 6 | 4 | 6 | 4 |
| G15 | 4 | 4 | 6 | 4 | 4 | 6 | 6 | 4 | 6 | 4 | 6 | 6 | 6 | 6 | 0 | 6 | 6 | 6 | 4 | 6 | 6 | 4 | 4 | 6 | 4 | 6 |
| G16 | 4 | 4 | 4 | 6 | 4 | 6 | 4 | 6 | 4 | 6 | 4 | 6 | 6 | 6 | 6 | 0 | 6 | 6 | 6 | 4 | 6 | 6 | 4 | 6 | 4 | 6 |
| H1 | 10 | 4 | 4 | 4 | 4 | 6 | 4 | 6 | 6 | 6 | 4 | 4 | 4 | 6 | 6 | 6 | 0 | 6 | 6 | 6 | 6 | 4 | 6 | 4 | 6 | 4 |
| H2 | 4 | 10 | 4 | 4 | 4 | 6 | 6 | 4 | 6 | 4 | 4 | 4 | 6 | 4 | 6 | 6 | 6 | 0 | 6 | 6 | 6 | 4 | 4 | 6 | 4 | 6 |
| H3 | 4 | 4 | 10 | 4 | 6 | 4 | 4 | 6 | 4 | 6 | 4 | 4 | 6 | 6 | 4 | 6 | 6 | 6 | 0 | 6 | 4 | 6 | 6 | 4 | 6 | 4 |
| H4 | 4 | 4 | 4 | 10 | 6 | 4 | 6 | 4 | 4 | 4 | 4 | 4 | 6 | 6 | 6 | 4 | 6 | 6 | 6 | 0 | 4 | 6 | 4 | 6 | 6 | 4 |
| H5 | 4 | 4 | 6 | 6 | 10 | 6 | 4 | 4 | 4 | 4 | 4 | 6 | 4 | 4 | 6 | 6 | 6 | 6 | 4 | 4 | 0 | 4 | 6 | 6 | 6 | 6 |
| H6 | 6 | 6 | 4 | 4 | 6 | 10 | 4 | 4 | 4 | 4 | 4 | 6 | 6 | 6 | 4 | 6 | 4 | 4 | 6 | 6 | 4 | 0 | 6 | 6 | 6 | 6 |
| H7 | 4 | 6 | 4 | 6 | 4 | 4 | 10 | 6 | 4 | 4 | 4 | 6 | 4 | 6 | 4 | 4 | 6 | 4 | 6 | 4 | 6 | 6 | 0 | 4 | 6 | 6 |
| H8 | 6 | 4 | 6 | 4 | 4 | 4 | 6 | 10 | 4 | 4 | 4 | 6 | 6 | 4 | 6 | 4 | 4 | 6 | 4 | 6 | 6 | 6 | 4 | 0 | 6 | 6 |
| H9 | 4 | 6 | 6 | 4 | 4 | 4 | 4 | 4 | 10 | 6 | 4 | 6 | 4 | 6 | 4 | 6 | 6 | 4 | 6 | 6 | 6 | 6 | 6 | 6 | 0 | 4 |
| H10 | 6 | 4 | 4 | 6 | 4 | 4 | 4 | 4 | 6 | 10 | 4 | 6 | 6 | 4 | 6 | 4 | 4 | 6 | 4 | 4 | 6 | 6 | 6 | 6 | 4 | 0 |

A value in Table 1-3 represents a code distance between two codewords.

Another embodiment of the present invention provides a method for encoding feedback signals. The method may include:

encoding feedback signals of three carriers to output a bit sequence; and transmitting the bit sequence on an uplink HS-DPCCH, in which the encoding the feedback signals of the three carriers includes: mapping the feedback signals of the three carriers into a codeword selected from a codebook, in which the codebook comprises codewords A1 to A6, B1 to B6, C1 to C6, and D1 to D6, in which code distance relationships of the codewords in the codebook are as shown in Table 1-4:

where a value in Table 1-4 represents a code distance between corresponding codewords.

Further another embodiment of the present invention provides a method for encoding feedback signal. The method may include:

encoding feedback signals of three carriers; and transmitting a bit sequence encoded and output on an uplink HS-DPCCH, in which the encoding the feedback signals of the three carriers includes: mapping the feedback signals of the three carriers into a codeword selected from a codebook, in which the codebook comprises codewords A1 to A6, B1 to B6, C1 to C6, D1 to D6, E1, and F1, in which code distance relationships of the codewords in the codebook are as shown in Table 1-5:

TABLE 1-4

|  | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 |
|---|---|---|---|---|---|---|---|---|---|---|---|---|---|---|---|---|---|---|---|---|---|---|---|---|
| A1 | 0 | 6 | 6 | 6 | 6 | 6 | 10 | 4 | 4 | 4 | 4 | 4 | 5 | 5 | 5 | 5 | 5 | 5 | 5 | 5 | 5 | 5 | 5 | 5 |
| A2 | 6 | 0 | 6 | 6 | 6 | 6 | 4 | 10 | 4 | 4 | 4 | 4 | 5 | 5 | 5 | 5 | 5 | 5 | 5 | 5 | 5 | 5 | 5 | 5 |
| A3 | 6 | 6 | 0 | 6 | 6 | 6 | 4 | 4 | 10 | 4 | 4 | 4 | 5 | 5 | 5 | 5 | 5 | 5 | 5 | 5 | 5 | 5 | 5 | 5 |
| A4 | 6 | 6 | 6 | 0 | 6 | 6 | 4 | 4 | 4 | 10 | 4 | 4 | 5 | 5 | 5 | 5 | 5 | 5 | 5 | 5 | 5 | 5 | 5 | 5 |
| A5 | 6 | 6 | 6 | 6 | 0 | 6 | 4 | 4 | 4 | 4 | 10 | 4 | 5 | 5 | 5 | 5 | 5 | 5 | 5 | 5 | 5 | 5 | 5 | 5 |
| A6 | 6 | 6 | 6 | 6 | 6 | 0 | 4 | 4 | 4 | 4 | 4 | 10 | 5 | 5 | 5 | 5 | 5 | 5 | 5 | 5 | 5 | 5 | 5 | 5 |
| B1 | 10 | 4 | 4 | 4 | 4 | 4 | 0 | 6 | 6 | 6 | 6 | 6 | 5 | 5 | 5 | 5 | 5 | 5 | 5 | 5 | 5 | 5 | 5 | 5 |
| B2 | 4 | 10 | 4 | 4 | 4 | 4 | 6 | 0 | 6 | 6 | 6 | 6 | 5 | 5 | 5 | 5 | 5 | 5 | 5 | 5 | 5 | 5 | 5 | 5 |
| B3 | 4 | 4 | 10 | 4 | 4 | 4 | 6 | 6 | 0 | 6 | 6 | 6 | 5 | 5 | 5 | 5 | 5 | 5 | 5 | 5 | 5 | 5 | 5 | 5 |
| B4 | 4 | 4 | 4 | 10 | 4 | 4 | 6 | 6 | 6 | 0 | 6 | 6 | 5 | 5 | 5 | 5 | 5 | 5 | 5 | 5 | 5 | 5 | 5 | 5 |
| B5 | 4 | 4 | 4 | 4 | 10 | 4 | 6 | 6 | 6 | 6 | 0 | 6 | 5 | 5 | 5 | 5 | 5 | 5 | 5 | 5 | 5 | 5 | 5 | 5 |
| B6 | 4 | 4 | 4 | 4 | 4 | 10 | 6 | 6 | 6 | 6 | 6 | 0 | 5 | 5 | 5 | 5 | 5 | 5 | 5 | 5 | 5 | 5 | 5 | 5 |
| C1 | 5 | 5 | 5 | 5 | 5 | 5 | 5 | 5 | 5 | 5 | 5 | 5 | 0 | 6 | 6 | 6 | 6 | 6 | 10 | 4 | 4 | 4 | 4 | 4 |
| C2 | 5 | 5 | 5 | 5 | 5 | 5 | 5 | 5 | 5 | 5 | 5 | 5 | 6 | 0 | 6 | 6 | 6 | 6 | 4 | 10 | 4 | 4 | 4 | 4 |
| C3 | 5 | 5 | 5 | 5 | 5 | 5 | 5 | 5 | 5 | 5 | 5 | 5 | 6 | 6 | 0 | 6 | 6 | 6 | 4 | 4 | 10 | 4 | 4 | 4 |
| C4 | 5 | 5 | 5 | 5 | 5 | 5 | 5 | 5 | 5 | 5 | 5 | 5 | 6 | 6 | 6 | 0 | 6 | 6 | 4 | 4 | 4 | 10 | 4 | 4 |
| C5 | 5 | 5 | 5 | 5 | 5 | 5 | 5 | 5 | 5 | 5 | 5 | 5 | 6 | 6 | 6 | 6 | 0 | 6 | 4 | 4 | 4 | 4 | 10 | 4 |
| C6 | 5 | 5 | 5 | 5 | 5 | 5 | 5 | 5 | 5 | 5 | 5 | 5 | 6 | 6 | 6 | 6 | 6 | 0 | 4 | 4 | 4 | 4 | 4 | 10 |
| D1 | 5 | 5 | 5 | 5 | 5 | 5 | 5 | 5 | 5 | 5 | 5 | 5 | 10 | 4 | 4 | 4 | 4 | 4 | 0 | 6 | 6 | 6 | 6 | 6 |
| D2 | 5 | 5 | 5 | 5 | 5 | 5 | 5 | 5 | 5 | 5 | 5 | 5 | 4 | 10 | 4 | 4 | 4 | 4 | 6 | 0 | 6 | 6 | 6 | 6 |
| D3 | 5 | 5 | 5 | 5 | 5 | 5 | 5 | 5 | 5 | 5 | 5 | 5 | 4 | 4 | 10 | 4 | 4 | 4 | 6 | 6 | 0 | 6 | 6 | 6 |
| D4 | 5 | 5 | 5 | 5 | 5 | 5 | 5 | 5 | 5 | 5 | 5 | 5 | 4 | 4 | 4 | 10 | 4 | 4 | 6 | 6 | 6 | 0 | 6 | 6 |
| D5 | 5 | 5 | 5 | 5 | 5 | 5 | 5 | 5 | 5 | 5 | 5 | 5 | 4 | 4 | 4 | 4 | 10 | 4 | 6 | 6 | 6 | 6 | 0 | 6 |
| D6 | 5 | 5 | 5 | 5 | 5 | 5 | 5 | 5 | 5 | 5 | 5 | 5 | 4 | 4 | 4 | 4 | 4 | 10 | 6 | 6 | 6 | 6 | 6 | 0 |

TABLE 1-5

|    | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 | E1 | F1 |
|----|----|----|----|----|----|----|----|----|----|----|----|----|----|----|----|----|----|----|----|----|----|----|----|----|----|----|
| A1 | 0  | 6  | 6  | 6  | 6  | 6  | 10 | 4  | 4  | 4  | 4  | 4  | 5  | 5  | 5  | 5  | 5  | 5  | 5  | 5  | 5  | 5  | 5  | 5  | 6  | 4  |
| A2 | 6  | 0  | 6  | 6  | 6  | 6  | 4  | 10 | 4  | 4  | 4  | 4  | 5  | 5  | 5  | 5  | 5  | 5  | 5  | 5  | 5  | 5  | 5  | 5  | 6  | 4  |
| A3 | 6  | 6  | 0  | 6  | 6  | 6  | 4  | 4  | 10 | 4  | 4  | 4  | 5  | 5  | 5  | 5  | 5  | 5  | 5  | 5  | 5  | 5  | 5  | 5  | 6  | 4  |
| A4 | 6  | 6  | 6  | 0  | 6  | 6  | 4  | 4  | 4  | 10 | 4  | 4  | 5  | 5  | 5  | 5  | 5  | 5  | 5  | 5  | 5  | 5  | 5  | 5  | 4  | 6  |
| A5 | 6  | 6  | 6  | 6  | 0  | 6  | 4  | 4  | 4  | 4  | 10 | 4  | 5  | 5  | 5  | 5  | 5  | 5  | 5  | 5  | 5  | 5  | 5  | 5  | 4  | 6  |
| A6 | 6  | 6  | 6  | 6  | 6  | 0  | 4  | 4  | 4  | 4  | 4  | 10 | 5  | 5  | 5  | 5  | 5  | 5  | 5  | 5  | 5  | 5  | 5  | 5  | 4  | 6  |
| B1 | 10 | 4  | 4  | 4  | 4  | 4  | 0  | 6  | 6  | 6  | 6  | 6  | 5  | 5  | 5  | 5  | 5  | 5  | 5  | 5  | 5  | 5  | 5  | 5  | 4  | 6  |
| B2 | 4  | 10 | 4  | 4  | 4  | 4  | 6  | 0  | 6  | 6  | 6  | 6  | 5  | 5  | 5  | 5  | 5  | 5  | 5  | 5  | 5  | 5  | 5  | 5  | 4  | 6  |
| B3 | 4  | 4  | 10 | 4  | 4  | 4  | 6  | 6  | 0  | 6  | 6  | 6  | 5  | 5  | 5  | 5  | 5  | 5  | 5  | 5  | 5  | 5  | 5  | 5  | 4  | 6  |
| B4 | 4  | 4  | 4  | 10 | 4  | 4  | 6  | 6  | 6  | 0  | 6  | 6  | 5  | 5  | 5  | 5  | 5  | 5  | 5  | 5  | 5  | 5  | 5  | 5  | 6  | 4  |
| B5 | 4  | 4  | 4  | 4  | 10 | 4  | 6  | 6  | 6  | 6  | 0  | 6  | 5  | 5  | 5  | 5  | 5  | 5  | 5  | 5  | 5  | 5  | 5  | 5  | 6  | 4  |
| B6 | 4  | 4  | 4  | 4  | 4  | 10 | 6  | 6  | 6  | 6  | 6  | 0  | 5  | 5  | 5  | 5  | 5  | 5  | 5  | 5  | 5  | 5  | 5  | 5  | 6  | 4  |
| C1 | 5  | 5  | 5  | 5  | 5  | 5  | 5  | 5  | 5  | 5  | 5  | 5  | 0  | 6  | 6  | 6  | 6  | 6  | 10 | 4  | 4  | 4  | 4  | 4  | 7  | 3  |
| C2 | 5  | 5  | 5  | 5  | 5  | 5  | 5  | 5  | 5  | 5  | 5  | 5  | 6  | 0  | 6  | 6  | 6  | 6  | 4  | 10 | 4  | 4  | 4  | 4  | 7  | 3  |
| C3 | 5  | 5  | 5  | 5  | 5  | 5  | 5  | 5  | 5  | 5  | 5  | 5  | 6  | 6  | 0  | 6  | 6  | 6  | 4  | 4  | 10 | 4  | 4  | 4  | 3  | 7  |
| C4 | 5  | 5  | 5  | 5  | 5  | 5  | 5  | 5  | 5  | 5  | 5  | 5  | 6  | 6  | 6  | 0  | 6  | 6  | 4  | 4  | 4  | 10 | 4  | 4  | 7  | 3  |
| C5 | 5  | 5  | 5  | 5  | 5  | 5  | 5  | 5  | 5  | 5  | 5  | 5  | 6  | 6  | 6  | 6  | 0  | 6  | 4  | 4  | 4  | 4  | 10 | 4  | 3  | 7  |
| C6 | 5  | 5  | 5  | 5  | 5  | 5  | 5  | 5  | 5  | 5  | 5  | 5  | 6  | 6  | 6  | 6  | 6  | 0  | 4  | 4  | 4  | 4  | 4  | 10 | 3  | 7  |
| D1 | 5  | 5  | 5  | 5  | 5  | 5  | 5  | 5  | 5  | 5  | 5  | 5  | 10 | 4  | 4  | 4  | 4  | 4  | 0  | 6  | 6  | 6  | 6  | 6  | 3  | 7  |
| D2 | 5  | 5  | 5  | 5  | 5  | 5  | 5  | 5  | 5  | 5  | 5  | 5  | 4  | 10 | 4  | 4  | 4  | 4  | 6  | 0  | 6  | 6  | 6  | 6  | 3  | 7  |
| D3 | 5  | 5  | 5  | 5  | 5  | 5  | 5  | 5  | 5  | 5  | 5  | 5  | 4  | 4  | 10 | 4  | 4  | 4  | 6  | 6  | 0  | 6  | 6  | 6  | 7  | 3  |
| D4 | 5  | 5  | 5  | 5  | 5  | 5  | 5  | 5  | 5  | 5  | 5  | 5  | 4  | 4  | 4  | 10 | 4  | 4  | 6  | 6  | 6  | 0  | 6  | 6  | 3  | 7  |
| D5 | 5  | 5  | 5  | 5  | 5  | 5  | 5  | 5  | 5  | 5  | 5  | 5  | 4  | 4  | 4  | 4  | 10 | 4  | 6  | 6  | 6  | 6  | 0  | 6  | 7  | 3  |
| D6 | 5  | 5  | 5  | 5  | 5  | 5  | 5  | 5  | 5  | 5  | 5  | 5  | 4  | 4  | 4  | 4  | 4  | 10 | 6  | 6  | 6  | 6  | 6  | 0  | 7  | 3  |
| E1 | 6  | 6  | 6  | 4  | 4  | 4  | 4  | 4  | 4  | 6  | 6  | 6  | 7  | 7  | 3  | 7  | 3  | 3  | 3  | 3  | 7  | 3  | 7  | 7  | 0  | 10 |
| F1 | 4  | 4  | 4  | 6  | 6  | 6  | 6  | 6  | 6  | 4  | 4  | 4  | 3  | 3  | 7  | 3  | 7  | 7  | 7  | 7  | 3  | 7  | 3  | 3  | 10 | 0  | where a value in Table 1-5 represents a code distance between two codewords.

Further another embodiment of the present invention provides a method for encoding feedback signal. The method may include:

encoding feedback signals of three carriers to output a bit sequence; and transmitting the bit sequence on an uplink HS-DPCCH, in which the encoding the feedback signals of the three carriers includes: mapping the feedback signals of the three carriers into a codeword selected from a codebook, in which the codebook comprises codewords A1 to A6, B1 to B6, C1 to C6, D1 to D6, E1, and F1, in which code distance relationships of the codewords in the codebook are as shown in Table 1-6:

TABLE 1-6

|    | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 | E2 | F2 |
|----|----|----|----|----|----|----|----|----|----|----|----|----|----|----|----|----|----|----|----|----|----|----|----|----|----|----|
| A1 | 0  | 6  | 6  | 6  | 6  | 6  | 10 | 4  | 4  | 4  | 4  | 4  | 5  | 5  | 5  | 5  | 5  | 5  | 5  | 5  | 5  | 5  | 5  | 5  | 7  | 3  |
| A2 | 6  | 0  | 6  | 6  | 6  | 6  | 4  | 10 | 4  | 4  | 4  | 4  | 5  | 5  | 5  | 5  | 5  | 5  | 5  | 5  | 5  | 5  | 5  | 5  | 5  | 5  |
| A3 | 6  | 6  | 0  | 6  | 6  | 6  | 4  | 4  | 10 | 4  | 4  | 4  | 5  | 5  | 5  | 5  | 5  | 5  | 5  | 5  | 5  | 5  | 5  | 5  | 5  | 5  |
| A4 | 6  | 6  | 6  | 0  | 6  | 6  | 4  | 4  | 4  | 10 | 4  | 4  | 5  | 5  | 5  | 5  | 5  | 5  | 5  | 5  | 5  | 5  | 5  | 5  | 3  | 7  |
| A5 | 6  | 6  | 6  | 6  | 0  | 6  | 4  | 4  | 4  | 4  | 10 | 4  | 5  | 5  | 5  | 5  | 5  | 5  | 5  | 5  | 5  | 5  | 5  | 5  | 7  | 3  |
| A6 | 6  | 6  | 6  | 6  | 6  | 0  | 4  | 4  | 4  | 4  | 4  | 10 | 5  | 5  | 5  | 5  | 5  | 5  | 5  | 5  | 5  | 5  | 5  | 5  | 3  | 7  |
| B1 | 10 | 4  | 4  | 4  | 4  | 4  | 0  | 6  | 6  | 6  | 6  | 6  | 5  | 5  | 5  | 5  | 5  | 5  | 5  | 5  | 5  | 5  | 5  | 5  | 3  | 7  |
| B2 | 4  | 10 | 4  | 4  | 4  | 4  | 6  | 0  | 6  | 6  | 6  | 6  | 5  | 5  | 5  | 5  | 5  | 5  | 5  | 5  | 5  | 5  | 5  | 5  | 5  | 5  |
| B3 | 4  | 4  | 10 | 4  | 4  | 4  | 6  | 6  | 0  | 6  | 6  | 6  | 5  | 5  | 5  | 5  | 5  | 5  | 5  | 5  | 5  | 5  | 5  | 5  | 5  | 5  |
| B4 | 4  | 4  | 4  | 10 | 4  | 4  | 6  | 6  | 6  | 0  | 6  | 6  | 5  | 5  | 5  | 5  | 5  | 5  | 5  | 5  | 5  | 5  | 5  | 5  | 7  | 3  |
| B5 | 4  | 4  | 4  | 4  | 10 | 4  | 6  | 6  | 6  | 6  | 0  | 6  | 5  | 5  | 5  | 5  | 5  | 5  | 5  | 5  | 5  | 5  | 5  | 5  | 3  | 7  |
| B6 | 4  | 4  | 4  | 4  | 4  | 10 | 6  | 6  | 6  | 6  | 6  | 0  | 5  | 5  | 5  | 5  | 5  | 5  | 5  | 5  | 5  | 5  | 5  | 5  | 7  | 3  |
| C1 | 5  | 5  | 5  | 5  | 5  | 5  | 5  | 5  | 5  | 5  | 5  | 5  | 0  | 6  | 6  | 6  | 6  | 6  | 10 | 4  | 4  | 4  | 4  | 4  | 6  | 4  |
| C2 | 5  | 5  | 5  | 5  | 5  | 5  | 5  | 5  | 5  | 5  | 5  | 5  | 6  | 0  | 6  | 6  | 6  | 6  | 4  | 10 | 4  | 4  | 4  | 4  | 2  | 8  |
| C3 | 5  | 5  | 5  | 5  | 5  | 5  | 5  | 5  | 5  | 5  | 5  | 5  | 6  | 6  | 0  | 6  | 6  | 6  | 4  | 4  | 10 | 4  | 4  | 4  | 6  | 4  |
| C4 | 5  | 5  | 5  | 5  | 5  | 5  | 5  | 5  | 5  | 5  | 5  | 5  | 6  | 6  | 6  | 0  | 6  | 6  | 4  | 4  | 4  | 10 | 4  | 4  | 6  | 4  |
| C5 | 5  | 5  | 5  | 5  | 5  | 5  | 5  | 5  | 5  | 5  | 5  | 5  | 6  | 6  | 6  | 6  | 0  | 6  | 4  | 4  | 4  | 4  | 10 | 4  | 4  | 6  |
| C6 | 5  | 5  | 5  | 5  | 5  | 5  | 5  | 5  | 5  | 5  | 5  | 5  | 6  | 6  | 6  | 6  | 6  | 0  | 4  | 4  | 4  | 4  | 4  | 10 | 6  | 4  |
| D1 | 5  | 5  | 5  | 5  | 5  | 5  | 5  | 5  | 5  | 5  | 5  | 5  | 10 | 4  | 4  | 4  | 4  | 4  | 0  | 6  | 6  | 6  | 6  | 6  | 4  | 6  |
| D2 | 5  | 5  | 5  | 5  | 5  | 5  | 5  | 5  | 5  | 5  | 5  | 5  | 4  | 10 | 4  | 4  | 4  | 4  | 6  | 0  | 6  | 6  | 6  | 6  | 8  | 2  |
| D3 | 5  | 5  | 5  | 5  | 5  | 5  | 5  | 5  | 5  | 5  | 5  | 5  | 4  | 4  | 10 | 4  | 4  | 4  | 6  | 6  | 0  | 6  | 6  | 6  | 4  | 6  |
| D4 | 5  | 5  | 5  | 5  | 5  | 5  | 5  | 5  | 5  | 5  | 5  | 5  | 4  | 4  | 4  | 10 | 4  | 4  | 6  | 6  | 6  | 0  | 6  | 6  | 4  | 6  |
| D5 | 5  | 5  | 5  | 5  | 5  | 5  | 5  | 5  | 5  | 5  | 5  | 5  | 4  | 4  | 4  | 4  | 10 | 4  | 6  | 6  | 6  | 6  | 0  | 6  | 6  | 4  |
| D6 | 5  | 5  | 5  | 5  | 5  | 5  | 5  | 5  | 5  | 5  | 5  | 5  | 4  | 4  | 4  | 4  | 4  | 10 | 6  | 6  | 6  | 6  | 6  | 0  | 4  | 6  |
| E2 | 7  | 5  | 5  | 3  | 7  | 3  | 3  | 5  | 5  | 7  | 3  | 7  | 6  | 2  | 6  | 6  | 4  | 6  | 4  | 8  | 4  | 4  | 6  | 4  | 0  | 10 |
| F2 | 3  | 5  | 5  | 7  | 3  | 7  | 7  | 5  | 5  | 3  | 7  | 3  | 4  | 8  | 4  | 4  | 6  | 4  | 6  | 2  | 6  | 6  | 4  | 6  | 10 | 0  | where a value in Table 1-6 represents a code distance between two codewords.

Further another embodiment of the present invention provides an apparatus for encoding feedback signal. The apparatus may include:

an encoder, configured to encode feedback signals of three carriers to output a bit sequence; and a transmitter, configured to transmit the bit sequence encoded on an uplink HS-DPCCH, in which the encoder is further configured to map the feedback signals of the three carriers into a codewords selected from a codebook, in which the codebook comprises codewords G1 to G16 and H1 to H10, and code distance relationships of the codewords in the codebook are as shown in Table 1-3.

Further another embodiment of the present invention provides an apparatus for encoding feedback signal. The apparatus may include:

an encoder, configured to encode feedback signals of three carriers to output a bit sequence;

a transmitter, configured to transmit the bit sequence on an uplink HS-DPCCH, in which the encoder is further configured to map the feedback signals of the three carriers into a codeword selected from a codebook, in which the codebook comprises codewords A1 to A6, B1 to B6, C1 to C6, and D1 to D6, and code distance relationships of the codewords in the codebook are as shown in Table 1-4.

Further another embodiment of the present invention provides an apparatus for encoding feedback signal. The apparatus may include:

an encoder, configured to encode feedback signals of three carriers to output a bit sequence; and a transmitter, configured to transmit the bit sequence on an uplink HS-DPCCH, in which the encoder is further configured to map the feedback signals of the three carriers into a codeword selected from a codebook, in which the codebook comprises codewords A1 to A6, B1 to B6, C1 to C6, D1 to D6, E1, and F1, and code distance relationships of the codewords in the codebook are as shown in Table 1-5.

Further another embodiment of the present invention provides an apparatus for encoding feedback signal. The apparatus may include:

an encoder, configured to encode feedback signals of three carriers to output a bit sequence; and a transmitter, configured to transmit the bit sequence on an uplink HS-DPCCH, in which the encoder is further configured to map the feedback signals of the three carriers into a codeword selected from a codebook, in which the codebook comprises codewords A1 to A6, B1 to B6, C1 to C6, D1 to D6, E1, and F1, in which code distance relationships of the codewords in the codebook are as shown in Table 1-6.

The embodiments of the present invention provide methods for jointly encoding feedback signals of three carriers in TC mode. In the embodiments of the present invention, a single code channel is applied, which not only reduces power overhead and improves system performance, but does not affect CM value.

DETAILED DESCRIPTION OF THE INVENTION

Figure 1:
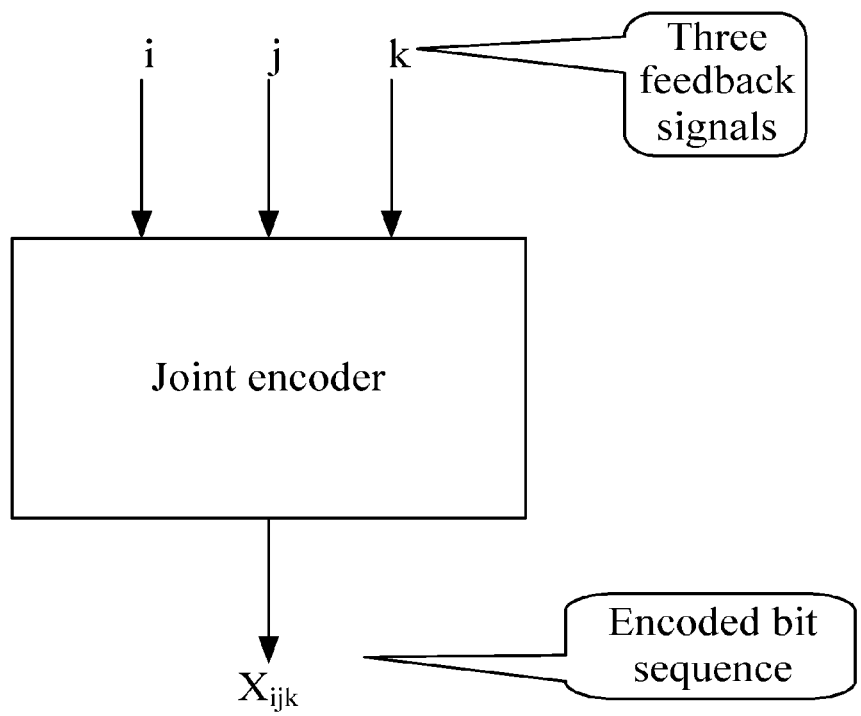
FIG. 1 is a schematic structure of a HARQ-ACK joint encoder in TC mode according to an embodiment of the present invention.

FIG. 1 is a schematic structure of a HARQ-ACK joint encoder in TC mode according to an embodiment of the present invention. In TC mode, a Node B transmits data to a UE on at most three carriers simultaneously, and after receiving at most three data blocks, the UE is required to transmit feedback for receiving the data each, in which feedback information includes DTX, ACK, and NACK. The UE synthesizes the feedback information of the three carriers, namely, encodes the feedback information into a 10-bit 0-1 sequence, and transmits to the Node B through a HS-DPCCH. The Node B selects a decode space to decode the feedback information according to the sending mode.

As shown in FIG. 1, the input signals of the joint encoder are feedback signals for a UE receiving data, i, j, and k are feedback signals for receiving data from three carriers. Values of i, j, and k may be DTX, ACK, or NACK. The output signal of the joint encoder is a 10-bit 0-1 sequence, represented with $X_{ijk}$. Functions of the joint encoder are that the UE encodes feedback signals of at most three carriers, and transmits the outputted bit sequence on a HS-DPCCH.

When the Node B applies three carriers to send data, seven data sending modes exist with reference to Table 1-7.

TABLE 1-7

Data Sending Mode With TC

| | Carrier 1 | Carrier 2 | Carrier 3 |
| --- | --- | --- | --- |
| Mode 1 | On | Off | Off |
| Mode 2 | Off | On | Off |
| Mode 3 | Off | Off | On |
| Mode 4 | On | On | Off |
| Mode 5 | On | Off | On |
| Mode 6 | Off | On | On |
| Mode 7 | On | On | On |

In Table 1-7, "On" indicates that data is sent on the carrier, and "Off" indicates that data is not sent on the carrier or the carrier is deactivated.

Each of the sending modes corresponds to a decoding space, with reference to Table 1-8. After receiving the encoded feedback signals of the UE, the Node B may select a decoding space according to a sending mode, and decode the feedback signals in the decoding space.

TABLE 1-8

Relationship Between Sending Modes And Decoding Spaces

| Sending Mode | Decoding Space |
| --- | --- |
| Mode 1 | DTX, N-D-D, A-D-D |
| Mode 2 | DTX, D-N-D, D-A-D |
| Mode 3 | DTX, D-D-N, D-D-A |
| Mode 4 | DTX, D-N-D, D-A-D, N-D-D, A-D-D, N-N-D, A-N-D, N-A-D, A-A-D |

TABLE 1-8-continued

Relationship Between Sending Modes And Decoding Spaces

| Sending Mode | Decoding Space |
|---|---|
| Mode 5 | DTX, N-D-D, A-D-D, D-D-N, D-D-A, N-D-N, N-D-A, A-D-N, A-D-A |
| Mode 6 | DTX, D-N-D, D-A-D, D-D-N, D-D-A, D-N-N, D-N-A, D-A-N, D-A-A |
| Mode 7 | DTX, D-N-D, D-A-D, N-D-D, A-D-D, N-N-D, A-N-D, N-A-D, A-A-D, D-D-N, D-D-A, N-D-N, N-D-A, A-D-N, A-D-A, D-N-N, D-N-A, D-A-N, D-A-A, N-N-N, N-N-A, N-A-N, N-A-A, A-N-N, A-N-A, A-A-N, A-A-A |

In Table 1-8, for example, a feedback signal N-D-A is an abbreviation of NACK-DTX-ACK, which indicates that feedback information of Carrier 1 is NACK, feedback information of Carrier 2 is DTX, and feedback information of Carrier 3 is ACK. Other feedback signals are similar to this.

Embodiment 1 of a Method for Encoding Feedback Signal

Figure 2:
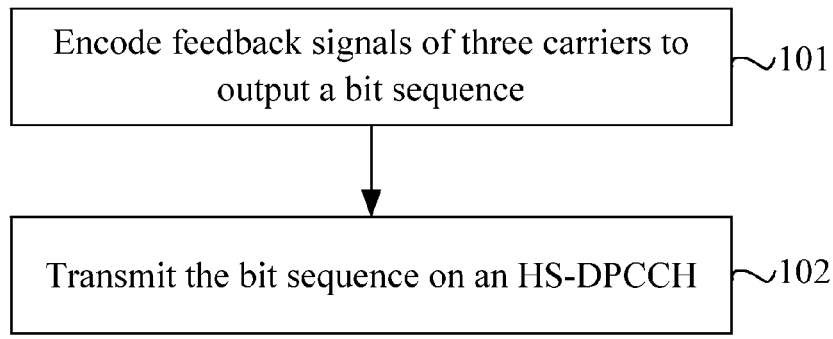
FIG. 2 is a flow chart of a method for encoding feedback signals according to another embodiment of the present invention.

FIG. 2 is a flow chart of a method for encoding feedback signal according to an embodiment of the present invention. As shown in FIG. 2, the method includes the following steps:

Step 101: encode feedback signals of three carriers to output a bit sequence.

Step 102: transmit the bit sequence on a HS-DPCCH.

The Step 101 may specifically include mapping the feedback signals of the three carriers into a codeword selected from a codebook. The codebook satisfies a particular code distance relationship, which may be acquired through computer searching or by using other methods. Under a condition that a certain requirement (such as compatibility) is satisfied, a principle of selecting a codebook is that the smallest code distance is maximized, and the number of the smallest code distances is minimized.

The codebook of this embodiment includes 26 codewords in total, and these codewords are selected from the codebook comprising codewords G1 to G16 and H1 to H10. For code distance relationships between codewords, reference can be made to Table 1-9.

TABLE 1-9

Code Distance Relationships Between Codewords

|  | G1 | G2 | G3 | G4 | G5 | G6 | G7 | G8 | G9 | G10 | G11 | G12 | G13 | G14 | G15 | G16 | H1 | H2 | H3 | H4 | H5 | H6 | H7 | H8 | H9 | H10 |
|---|---|---|---|---|---|---|---|---|---|---|---|---|---|---|---|---|---|---|---|---|---|---|---|---|---|---|
| G1 | 0 | 6 | 6 | 6 | 6 | 4 | 6 | 4 | 6 | 4 | 6 | 6 | 6 | 4 | 4 | 4 | 10 | 4 | 4 | 4 | 4 | 6 | 4 | 6 | 4 | 6 |
| G2 | 6 | 0 | 6 | 6 | 6 | 4 | 4 | 6 | 4 | 6 | 6 | 6 | 4 | 6 | 4 | 4 | 4 | 10 | 4 | 4 | 4 | 6 | 6 | 4 | 6 | 4 |
| G3 | 6 | 6 | 0 | 6 | 4 | 6 | 6 | 4 | 4 | 6 | 6 | 6 | 4 | 4 | 6 | 4 | 4 | 4 | 10 | 4 | 6 | 4 | 4 | 6 | 6 | 4 |
| G4 | 6 | 6 | 6 | 0 | 4 | 6 | 4 | 6 | 6 | 4 | 6 | 6 | 4 | 4 | 4 | 6 | 4 | 4 | 4 | 10 | 6 | 4 | 6 | 4 | 4 | 6 |
| G5 | 6 | 6 | 4 | 4 | 0 | 6 | 6 | 6 | 6 | 6 | 6 | 4 | 6 | 6 | 4 | 4 | 4 | 4 | 6 | 6 | 10 | 6 | 4 | 4 | 4 | 4 |
| G6 | 4 | 4 | 6 | 6 | 6 | 0 | 6 | 6 | 6 | 6 | 6 | 4 | 6 | 6 | 4 | 6 | 6 | 6 | 4 | 4 | 6 | 10 | 4 | 4 | 4 | 4 |
| G7 | 6 | 4 | 6 | 4 | 6 | 6 | 0 | 4 | 6 | 6 | 6 | 4 | 6 | 4 | 6 | 4 | 4 | 6 | 4 | 6 | 4 | 4 | 10 | 6 | 4 | 4 |
| G8 | 4 | 6 | 4 | 6 | 6 | 6 | 4 | 0 | 6 | 6 | 6 | 4 | 6 | 4 | 6 | 6 | 6 | 4 | 6 | 4 | 4 | 4 | 6 | 10 | 4 | 4 |
| G9 | 6 | 4 | 4 | 6 | 6 | 6 | 6 | 6 | 0 | 4 | 6 | 4 | 6 | 4 | 6 | 4 | 6 | 6 | 4 | 4 | 4 | 4 | 4 | 4 | 10 | 6 |
| G10 | 4 | 6 | 6 | 4 | 6 | 6 | 6 | 6 | 4 | 0 | 6 | 4 | 6 | 6 | 4 | 6 | 4 | 4 | 6 | 4 | 4 | 4 | 4 | 4 | 6 | 10 |
| G11 | 6 | 6 | 6 | 6 | 6 | 6 | 6 | 6 | 6 | 6 | 0 | 6 | 6 | 6 | 6 | 6 | 4 | 4 | 4 | 4 | 4 | 4 | 4 | 4 | 4 | 4 |
| G12 | 6 | 6 | 6 | 6 | 4 | 4 | 4 | 4 | 4 | 4 | 6 | 0 | 6 | 6 | 6 | 6 | 4 | 4 | 4 | 6 | 6 | 6 | 6 | 6 | 6 | 6 |
| G13 | 6 | 4 | 4 | 4 | 6 | 6 | 6 | 6 | 6 | 6 | 6 | 6 | 0 | 6 | 6 | 6 | 4 | 6 | 6 | 6 | 4 | 6 | 4 | 6 | 4 | 6 |
| G14 | 4 | 6 | 4 | 4 | 6 | 6 | 4 | 4 | 4 | 6 | 6 | 6 | 6 | 0 | 6 | 6 | 6 | 4 | 6 | 6 | 4 | 6 | 6 | 4 | 6 | 4 |
| G15 | 4 | 4 | 6 | 4 | 4 | 4 | 6 | 6 | 6 | 4 | 6 | 6 | 6 | 6 | 0 | 6 | 6 | 6 | 4 | 6 | 6 | 4 | 6 | 6 | 4 | 6 |
| G16 | 4 | 4 | 4 | 6 | 4 | 6 | 4 | 6 | 4 | 6 | 6 | 6 | 6 | 6 | 6 | 0 | 6 | 6 | 6 | 4 | 6 | 4 | 6 | 4 | 4 | 6 |
| H1 | 10 | 4 | 4 | 4 | 4 | 6 | 4 | 6 | 6 | 4 | 4 | 4 | 4 | 6 | 6 | 6 | 0 | 6 | 6 | 6 | 6 | 4 | 6 | 4 | 6 | 4 |
| H2 | 4 | 10 | 4 | 4 | 4 | 6 | 6 | 4 | 6 | 4 | 4 | 4 | 6 | 4 | 6 | 6 | 6 | 0 | 6 | 6 | 6 | 4 | 6 | 4 | 6 | 4 |
| H3 | 4 | 4 | 10 | 4 | 6 | 4 | 4 | 6 | 4 | 6 | 4 | 4 | 6 | 6 | 4 | 6 | 6 | 6 | 0 | 6 | 4 | 6 | 6 | 4 | 4 | 6 |
| H4 | 4 | 4 | 4 | 10 | 6 | 4 | 6 | 4 | 4 | 4 | 4 | 6 | 6 | 6 | 6 | 4 | 6 | 6 | 6 | 0 | 4 | 6 | 4 | 6 | 6 | 4 |
| H5 | 4 | 4 | 6 | 6 | 10 | 6 | 4 | 4 | 4 | 4 | 4 | 6 | 4 | 4 | 6 | 6 | 6 | 6 | 4 | 4 | 0 | 4 | 6 | 6 | 6 | 6 |
| H6 | 6 | 6 | 4 | 4 | 6 | 10 | 4 | 4 | 4 | 4 | 4 | 6 | 6 | 6 | 4 | 4 | 4 | 4 | 6 | 6 | 4 | 0 | 6 | 6 | 6 | 6 |
| H7 | 4 | 6 | 4 | 6 | 4 | 4 | 10 | 6 | 4 | 4 | 4 | 6 | 4 | 6 | 6 | 6 | 6 | 6 | 6 | 4 | 6 | 6 | 0 | 4 | 6 | 6 |
| H8 | 6 | 4 | 6 | 4 | 4 | 4 | 6 | 10 | 4 | 4 | 4 | 6 | 6 | 4 | 6 | 4 | 4 | 6 | 4 | 6 | 6 | 6 | 4 | 0 | 6 | 6 |
| H9 | 4 | 6 | 6 | 4 | 4 | 4 | 4 | 4 | 10 | 6 | 4 | 6 | 4 | 6 | 4 | 4 | 6 | 6 | 4 | 6 | 6 | 6 | 6 | 6 | 0 | 4 |
| H10 | 6 | 4 | 4 | 6 | 4 | 4 | 4 | 4 | 6 | 10 | 4 | 6 | 6 | 4 | 6 | 6 | 4 | 6 | 6 | 4 | 6 | 6 | 6 | 6 | 4 | 0 |

A value in Table 1-9 represents a code distance between two codewords, for example, the code distance between G1 and G2 is 6, the code distance between G1 and G6 is 4, and so on.

Further, in step 101, for mapping the feedback signals into a codeword selected from the codebook, reference can be made to Table 1-10.

TABLE 1-10

Mapping Solution Between Feedback Signals And Codewords

| Feedback signal of Carrier 3 | Feedback signal of Carrier 1 | Feedback signal of Carrier 2 | | |
|---|---|---|---|---|
| | | DTX | NACK | ACK |
| DTX | DTX | * | G8 | H8 |
|  | NACK | H3 | H7 | H9 |
|  | ACK | G3 | G4 | H6 |
| NACK | DTX | H1 | G6 | G10 |
|  | NACK | G2 | H2 | G16 |
|  | ACK | G12 | G15 | G5 |
| ACK | DTX | G1 | G14 | G7 |
|  | NACK | H4 | H5 | G11 |
|  | ACK | H10 | G9 | G13 |

It can be seen from Table 1-10 that, in this embodiment, the feedback signal D-N-D is mapped into G8; the feedback signal D-A-D is mapped into H8; the feedback signal N-D-D is mapped into H3; the feedback signal N-N-D is mapped into H7; the feedback signal N-A-D is mapped into H9; the feedback signal A-D-D is mapped into G3; the feedback signal A-N-D is mapped into G4; the feedback signal A-A-D is mapped into H6; the feedback signal D-D-N is mapped into H1; the feedback signal D-N-N is mapped into G6; the feedback signal D-A-N is mapped into G10; the feedback signal N-D-N is mapped into G2; the feedback signal N-N-N is mapped into H2; the feedback signal N-A-N is mapped into G16; the feedback signal A-D-N is mapped into G12; the feedback signal A-N-N is mapped into G15; the feedback signal A-A-N is mapped into G5; the feedback signal D-D-A is mapped into G1; the feedback signal D-N-A is mapped into G14; the feedback signal D-A-A is mapped into G7; the feedback signal N-D-A is mapped into H4; the feedback signal N-N-A is mapped into H5; the feedback signal N-A-A is mapped into G11; the feedback signal A-D-A is mapped into H10; the feedback signal A-N-A is mapped into G9; and the feedback signal A-A-A is mapped into G13.

Still further, in this embodiment, codeword values, namely bit sequences, corresponding to each codeword are provided, and mapping relationships between codewords and bit sequences may be referred to Table 1-11. As can be seen from Table 1-11, the codebook comprises 26 codeword values with the smallest code distance of 4.

TABLE 1-11

Mapping Relationships Between Codewords And Bit Sequences

| Codeword | Bit sequence | | | | | | | | | |
|---|---|---|---|---|---|---|---|---|---|---|
| G1  | 1 | 0 | 0 | 0 | 1 | 0 | 1 | 0 | 1 | 0 |
| G2  | 0 | 0 | 1 | 1 | 1 | 0 | 0 | 0 | 0 | 1 |
| G3  | 1 | 1 | 1 | 1 | 1 | 1 | 1 | 1 | 1 | 1 |
| G4  | 1 | 0 | 1 | 0 | 0 | 1 | 0 | 1 | 0 | 0 |
| G5  | 1 | 1 | 1 | 1 | 0 | 0 | 0 | 1 | 1 | 0 |
| G6  | 1 | 1 | 1 | 0 | 0 | 1 | 1 | 0 | 0 | 1 |
| G7  | 0 | 0 | 1 | 0 | 0 | 1 | 0 | 0 | 1 | 1 |
| G8  | 0 | 0 | 1 | 1 | 0 | 0 | 1 | 1 | 0 | 0 |
| G9  | 0 | 1 | 1 | 0 | 1 | 0 | 1 | 1 | 0 | 1 |
| G10 | 0 | 1 | 1 | 1 | 1 | 1 | 0 | 0 | 1 | 0 |
| G11 | 0 | 1 | 0 | 1 | 0 | 1 | 1 | 0 | 0 | 0 |
| G12 | 0 | 1 | 0 | 0 | 0 | 0 | 0 | 1 | 1 | 1 |
| G13 | 1 | 0 | 0 | 1 | 1 | 1 | 0 | 1 | 0 | 1 |
| G14 | 0 | 0 | 1 | 0 | 1 | 1 | 1 | 1 | 1 | 0 |
| G15 | 1 | 1 | 1 | 0 | 1 | 0 | 0 | 0 | 0 | 1 |
| G16 | 1 | 0 | 1 | 1 | 0 | 0 | 1 | 0 | 1 | 1 |
| H1  | 0 | 1 | 1 | 1 | 0 | 1 | 0 | 1 | 0 | 1 |
| H2  | 1 | 1 | 0 | 0 | 0 | 1 | 1 | 1 | 1 | 0 |
| H3  | 0 | 0 | 0 | 0 | 0 | 0 | 0 | 0 | 0 | 0 |
| H4  | 0 | 1 | 0 | 1 | 1 | 0 | 1 | 0 | 1 | 1 |
| H5  | 0 | 0 | 0 | 0 | 1 | 1 | 1 | 0 | 0 | 1 |
| H6  | 0 | 0 | 0 | 1 | 1 | 0 | 0 | 1 | 1 | 0 |
| H7  | 1 | 1 | 0 | 1 | 1 | 0 | 1 | 1 | 0 | 0 |
| H8  | 1 | 1 | 0 | 0 | 1 | 1 | 0 | 0 | 1 | 1 |
| H9  | 1 | 0 | 0 | 1 | 0 | 1 | 0 | 0 | 1 | 0 |
| H10 | 1 | 0 | 0 | 0 | 0 | 0 | 1 | 1 | 0 | 1 |

Table 1-11 is a specific example. The present invention is not limited to merely the mapping relationships shown in Table 1-11, and those mapping relationships obtained by performing simple transformation on the basis of Table 1-11 also falls within the scope of the present invention, such as random changing of a sequence between columns on the basis of Table 1-11, or negation of a certain column value.

This embodiment provides a method for encoding feedback signals of three carriers in TC mode. In this embodiment, a single code channel is applied, which not only reduces power overhead, increases system capacity, and improves system performance, but does not affect CM value. Furthermore, in this embodiment, codebook satisfying a particular code distance relationship is selected, and a mapping solution between feedback signals and codewords is provided, so that signal error detection costs (including Radio Link Control (RLC) re-transmission cost and physical layer re-transmission cost) are minimized, thus improving data transmission efficiency.

Embodiment 2 of a Method for Encoding Feedback Signal

The method of this embodiment includes: encoding feedback signals of three carriers to output a bit sequence, and transmitting the bit sequence on a HS-DPCCH.

The encoding the feedback signals of the three carriers may specifically include: mapping the feedback signals of the three carriers into a codeword selected from a codebook. The codebook satisfies a particular code distance relationship, which may be acquired through computer searching or by using other methods. Under a condition that a certain requirement (such as compatibility) is satisfied, a principle of selecting a codebook is that the smallest code distance is maximized, and the number of the smallest code distances is minimized.

Specifically, the codebook in this embodiment includes 24 codewords in total, and these codewords are selected from the codebook comprising codewords A1 to A6, B1 to B6, C1 to C6, and D1 to D6. For code distance relationships between the codewords, reference can be made to Table 1-12.

TABLE 1-12

Code Distance Relationships Between Codewords

|    | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 |
|----|----|----|----|----|----|----|----|----|----|----|----|----|----|----|----|----|----|----|----|----|----|----|----|----|
| A1 | 0  | 6  | 6  | 6  | 6  | 6  | 10 | 4  | 4  | 4  | 4  | 4  | 5  | 5  | 5  | 5  | 5  | 5  | 5  | 5  | 5  | 5  | 5  | 5  |
| A2 | 6  | 0  | 6  | 6  | 6  | 6  | 4  | 10 | 4  | 4  | 4  | 4  | 5  | 5  | 5  | 5  | 5  | 5  | 5  | 5  | 5  | 5  | 5  | 5  |
| A3 | 6  | 6  | 0  | 6  | 6  | 6  | 4  | 4  | 10 | 4  | 4  | 4  | 5  | 5  | 5  | 5  | 5  | 5  | 5  | 5  | 5  | 5  | 5  | 5  |
| A4 | 6  | 6  | 6  | 0  | 6  | 6  | 4  | 4  | 4  | 10 | 4  | 4  | 5  | 5  | 5  | 5  | 5  | 5  | 5  | 5  | 5  | 5  | 5  | 5  |
| A5 | 6  | 6  | 6  | 6  | 0  | 6  | 4  | 4  | 4  | 4  | 10 | 4  | 5  | 5  | 5  | 5  | 5  | 5  | 5  | 5  | 5  | 5  | 5  | 5  |
| A6 | 6  | 6  | 6  | 6  | 6  | 0  | 4  | 4  | 4  | 4  | 4  | 10 | 5  | 5  | 5  | 5  | 5  | 5  | 5  | 5  | 5  | 5  | 5  | 5  |
| B1 | 10 | 4  | 4  | 4  | 4  | 4  | 0  | 6  | 6  | 6  | 6  | 6  | 5  | 5  | 5  | 5  | 5  | 5  | 5  | 5  | 5  | 5  | 5  | 5  |
| B2 | 4  | 10 | 4  | 4  | 4  | 4  | 6  | 0  | 6  | 6  | 6  | 6  | 5  | 5  | 5  | 5  | 5  | 5  | 5  | 5  | 5  | 5  | 5  | 5  |
| B3 | 4  | 4  | 10 | 4  | 4  | 4  | 6  | 6  | 0  | 6  | 6  | 6  | 5  | 5  | 5  | 5  | 5  | 5  | 5  | 5  | 5  | 5  | 5  | 5  |
| B4 | 4  | 4  | 4  | 10 | 4  | 4  | 6  | 6  | 6  | 0  | 6  | 6  | 5  | 5  | 5  | 5  | 5  | 5  | 5  | 5  | 5  | 5  | 5  | 5  |
| B5 | 4  | 4  | 4  | 4  | 10 | 4  | 6  | 6  | 6  | 6  | 0  | 6  | 5  | 5  | 5  | 5  | 5  | 5  | 5  | 5  | 5  | 5  | 5  | 5  |
| B6 | 4  | 4  | 4  | 4  | 4  | 10 | 6  | 6  | 6  | 6  | 6  | 0  | 5  | 5  | 5  | 5  | 5  | 5  | 5  | 5  | 5  | 5  | 5  | 5  |

TABLE 1-12-continued

Code Distance Relationships Between Codewords

|    | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 |
|----|----|----|----|----|----|----|----|----|----|----|----|----|----|----|----|----|----|----|----|----|----|----|----|----|
| C1 | 5 | 5 | 5 | 5 | 5 | 5 | 5 | 5 | 5 | 5 | 5 | 5 | 0 | 6 | 6 | 6 | 6 | 6 | 10 | 4 | 4 | 4 | 4 | 4 |
| C2 | 5 | 5 | 5 | 5 | 5 | 5 | 5 | 5 | 5 | 5 | 5 | 5 | 6 | 0 | 6 | 6 | 6 | 6 | 4 | 10 | 4 | 4 | 4 | 4 |
| C3 | 5 | 5 | 5 | 5 | 5 | 5 | 5 | 5 | 5 | 5 | 5 | 5 | 6 | 6 | 0 | 6 | 6 | 6 | 4 | 4 | 10 | 4 | 4 | 4 |
| C4 | 5 | 5 | 5 | 5 | 5 | 5 | 5 | 5 | 5 | 5 | 5 | 5 | 6 | 6 | 6 | 0 | 6 | 6 | 4 | 4 | 4 | 10 | 4 | 4 |
| C5 | 5 | 5 | 5 | 5 | 5 | 5 | 5 | 5 | 5 | 5 | 5 | 5 | 6 | 6 | 6 | 6 | 0 | 6 | 4 | 4 | 4 | 4 | 10 | 4 |
| C6 | 5 | 5 | 5 | 5 | 5 | 5 | 5 | 5 | 5 | 5 | 5 | 5 | 6 | 6 | 6 | 6 | 6 | 0 | 4 | 4 | 4 | 4 | 4 | 10 |
| D1 | 5 | 5 | 5 | 5 | 5 | 5 | 5 | 5 | 5 | 5 | 5 | 5 | 10 | 4 | 4 | 4 | 4 | 4 | 0 | 6 | 6 | 6 | 6 | 6 |
| D2 | 5 | 5 | 5 | 5 | 5 | 5 | 5 | 5 | 5 | 5 | 5 | 5 | 4 | 10 | 4 | 4 | 4 | 4 | 6 | 0 | 6 | 6 | 6 | 6 |
| D3 | 5 | 5 | 5 | 5 | 5 | 5 | 5 | 5 | 5 | 5 | 5 | 5 | 4 | 4 | 10 | 4 | 4 | 4 | 6 | 6 | 0 | 6 | 6 | 6 |
| D4 | 5 | 5 | 5 | 5 | 5 | 5 | 5 | 5 | 5 | 5 | 5 | 5 | 4 | 4 | 4 | 10 | 4 | 4 | 6 | 6 | 6 | 0 | 6 | 6 |
| D5 | 5 | 5 | 5 | 5 | 5 | 5 | 5 | 5 | 5 | 5 | 5 | 5 | 4 | 4 | 4 | 4 | 10 | 4 | 6 | 6 | 6 | 6 | 0 | 6 |
| D6 | 5 | 5 | 5 | 5 | 5 | 5 | 5 | 5 | 5 | 5 | 5 | 5 | 4 | 4 | 4 | 4 | 4 | 10 | 6 | 6 | 6 | 6 | 6 | 0 |

A value in Table 1-12 represents a code distance between two codewords, for example, the code distance between A1 and A1 is 0, the code distance between A1 and A2 is 6, the code distance between A1 and B1 is 10, and so on.

Further, for the mapping a feedback signal into a codeword selected from the codebook, reference can be made to Table 1-13.

TABLE 1-13

Mapping Solution Between Feedback Signals And Codewords

| Carrier 3 | Carrier 1 | Carrier 2 | | |
|---|---|---|---|---|
| | | DTX | NACK | ACK |
| DTX | DTX | * | D1 | C1 |
|  | NACK | B1 | C2 | A2 |
|  | ACK | A1 | B2 | D2 |
| NACK | DTX | A3 | C2 | C5 |
|  | NACK | D6 | C2 | A5 |
|  | ACK | D4 | A4 | B6 |
| ACK | DTX | B3 | C3 | C4 |
|  | NACK | D5 | A6 | B4 |
|  | ACK | D3 | B5 | C6 |

It can be seen from Table 1-13 that, in this embodiment, the feedback signal D-N-D is mapped into D1; the feedback signal D-A-D is mapped into C1; the feedback signal N-D-D is mapped into B1; the feedback signal N-N-D is mapped into C2; the feedback signal N-A-D is mapped into A2; the feedback signal A-D-D is mapped into A1; the feedback signal A-N-D is mapped into B2; the feedback signal A-A-D is mapped into D2; the feedback signal D-D-N is mapped into A3; the feedback signal D-N-N is mapped into C2; the feedback signal D-A-N is mapped into C5; the feedback signal N-D-N is mapped into D6; the feedback signal N-N-N is mapped into C2; the feedback signal N-A-N is mapped into A5; the feedback signal A-D-N is mapped into D4; the feedback signal A-N-N is mapped into A4; the feedback signal A-A-N is mapped into B6; the feedback signal D-D-A is mapped into B3; the feedback signal D-N-A is mapped into C3; the feedback signal D-A-A is mapped into C4; the feedback signal N-D-A is mapped into D5; the feedback signal N-N-A is mapped into A6; the feedback signal N-A-A is mapped into B4; the feedback signal A-D-A is mapped into D3; the feedback signal A-N-A is mapped into B5; and the feedback signal A-A-A is mapped into C6.

Referring to Table 1-13, in this embodiment, some feedback signals are encoded into the same codeword, for example, the feedback signals N-N-D, D-N-N, and N-N-N are all encoded into C2. During decoding procedure, the Node B may select a decoding space according to a sending mode, and decodes the feedback signals in the decoding space, so that when the sending mode is Modes 1 to 6, a codeword transmitted in this embodiment is capable of being correctly decoded; when the sending mode is Mode 7, and the Node B decodes a feedback signal to obtain a codeword C2, it is decided that the feedback signal is N-N-N.

Still further, in this embodiment, codeword values, namely bit sequences, corresponding to each codeword are provided, and mapping relationships between codewords and bit sequences may be referred to Table 1-14. As can be seen from Table 1-14, the codebook comprises 24 codeword values.

TABLE 1-14

Mapping Relationships Between Codewords And Bit Sequences

| Codeword | Bit sequence | | | | | | | | | |
|---|---|---|---|---|---|---|---|---|---|---|
| A1 | 1 | 1 | 1 | 1 | 1 | 1 | 1 | 1 | 1 | 1 |
| A2 | 0 | 0 | 1 | 1 | 0 | 0 | 1 | 1 | 0 | 0 |
| A3 | 1 | 1 | 0 | 0 | 0 | 1 | 1 | 0 | 0 | 0 |
| A4 | 1 | 0 | 0 | 1 | 0 | 0 | 0 | 0 | 1 | 1 |
| A5 | 0 | 1 | 0 | 0 | 1 | 0 | 0 | 1 | 1 | 0 |
| A6 | 0 | 0 | 1 | 0 | 1 | 1 | 0 | 0 | 0 | 1 |
| B1 | 0 | 0 | 0 | 0 | 0 | 0 | 0 | 0 | 0 | 0 |
| B2 | 1 | 1 | 0 | 0 | 1 | 1 | 0 | 0 | 1 | 1 |
| B3 | 0 | 0 | 1 | 1 | 1 | 0 | 0 | 1 | 1 | 1 |
| B4 | 0 | 1 | 1 | 0 | 1 | 1 | 1 | 1 | 0 | 0 |
| B5 | 1 | 0 | 1 | 1 | 0 | 1 | 1 | 0 | 0 | 1 |
| B6 | 1 | 1 | 0 | 1 | 0 | 0 | 1 | 1 | 1 | 0 |
| C1 | 1 | 1 | 1 | 1 | 1 | 0 | 0 | 0 | 0 | 0 |
| C2 | 0 | 1 | 0 | 1 | 0 | 1 | 0 | 1 | 0 | 1 |
| C3 | 0 | 1 | 1 | 0 | 0 | 0 | 1 | 0 | 1 | 1 |
| C4 | 1 | 0 | 1 | 0 | 0 | 1 | 0 | 1 | 1 | 0 |
| C5 | 0 | 0 | 0 | 1 | 1 | 1 | 1 | 0 | 1 | 0 |
| C6 | 1 | 0 | 0 | 0 | 1 | 0 | 1 | 1 | 0 | 1 |
| D1 | 0 | 0 | 0 | 0 | 0 | 1 | 1 | 1 | 1 | 1 |
| D2 | 1 | 0 | 1 | 0 | 1 | 0 | 1 | 0 | 1 | 0 |
| D3 | 1 | 0 | 0 | 1 | 1 | 1 | 0 | 1 | 0 | 0 |
| D4 | 0 | 1 | 0 | 1 | 1 | 0 | 1 | 0 | 0 | 1 |
| D5 | 1 | 1 | 1 | 0 | 0 | 0 | 0 | 1 | 0 | 1 |
| D6 | 0 | 1 | 1 | 1 | 0 | 1 | 0 | 0 | 1 | 0 |

Table 1-14 is a specific example. The present invention is not limited to merely the mapping relationships shown in Table 1-14, and those mapping relationships obtained by performing simple transformation on the basis of Table 1-14 also falls within the scope of the present invention, such as random changing of a sequence between columns on the basis of Table 1-14, or negation of a certain column value.

In this embodiment, 26 feedback signals are encoded with 24 codewords, and when the sending mode is Mode 7, a decoding error may occur to the Node B, for example, the feedback signal N-N-D or D-N-N of the UE is decoded into N-N-N, such that a bit error rate is affected. However, since fewer codewords are adopted, the entire system performance can be improved. In a scenario of a higher requirement of the system performance, this embodiment has good applicability.

This embodiment provides a method for encoding feedback signals of three carriers in TC mode. In this embodiment, a single code channel is applied, which not only reduces power overhead and improves system performance, but does not affect CM value.

Embodiment 3 of a Method for Encoding Feedback Signal

A difference between this embodiment and Embodiment 2 lies in a mapping solution between feedback signals and codewords. For the mapping solution of this embodiment, reference can be made to Table 1-15.

It can be seen from Table 1-15 that, in this embodiment, the feedback signal D-N-D is mapped into D1; the feedback signal D-A-D is mapped into C1; the feedback signal N-D-D is mapped into B1; the feedback signal N-N-D is mapped into C2; the feedback signal N-A-D is mapped into A2; the feedback signal A-D-D is mapped into A1; the feedback signal A-N-D is mapped into B2; the feedback signal A-A-D is mapped into D2; the feedback signal D-D-N is mapped into A3; the feedback signal D-N-N is mapped into C5; the feedback signal D-A-N is mapped into C4; the feedback signal N-D-N is mapped into C2; the feedback signal N-N-N is mapped into C2; the feedback signal N-A-N is mapped into A5; the feedback signal A-D-N is mapped into D3; the feedback signal A-N-N is mapped into A4; the feedback signal A-A-N is mapped into B6; the feedback signal D-D-A is mapped into B3; the feedback signal D-N-A is mapped into B4; the feedback signal D-A-A is mapped into D5; the feedback signal N-D-A is mapped into C3; the feedback signal N-N-A is mapped into D4; the feedback signal N-A-A is mapped into D6; the feedback signal A-D-A is mapped into B5; the feedback signal A-N-A is mapped into A6; and the feedback signal A-A-A is mapped into C6.

TABLE 1-15

Mapping Solution Between Feedback Signals And Codewords

| | | Carrier 2 | | |
|---|---|---|---|---|
| Carrier 3 | Carrier 1 | DTX | NACK | ACK |
| DTX | DTX | * | D1 | C1 |
| | NACK | B1 | C2 | A2 |
| | ACK | A1 | B2 | D2 |
| NACK | DTX | A3 | C5 | C4 |
| | NACK | C2 | C2 | A5 |
| | ACK | D3 | A4 | B6 |
| ACK | DTX | B3 | B4 | D5 |
| | NACK | C3 | D4 | D6 |
| | ACK | B5 | A6 | C6 |

Code distance relationships between codewords and mapping relationships between codewords and codeword values according to this embodiment may be the same as those in Embodiment 2, with reference to Tables 1-12 and 1-14.

Referring to Table 1-15, in this embodiment, also, some feedback signals are encoded into the same codeword, for example, the feedback signals N-N-D, N-D-N, and N-N-N are all encoded into C2. During decoding procedure, the Node B may select a decoding space according to a sending mode, and perform decoding procedure in the decoding space, so that when the sending mode is Modes 1 to 6, a codeword transmitted in this embodiment is capable of being correctly decoded; while when the sending mode is Mode 7, and the Node B decodes a feedback signal to obtain a codeword C2, it is decided that the feedback signal is N-N-N.

In this embodiment, 26 feedback signals are encoded with 24 codewords, and when the sending mode is Mode 7, a decoding error may occur to the Node B, for example, the feedback signal N-N-D or N-D-N of the UE is decoded into N-N-N, such that a bit error rate is affected. However, since fewer codewords are adopted, the entire system performance can be improved. In a scenario of a higher requirement of the system performance, this embodiment has good applicability.

This embodiment provides a method for encoding feedback signals of three carriers in TC mode. In this embodiment, a single code channel is applied, which not only reduces power overhead and improves system performance, but does not affect CM value.

Embodiment 4 of a Method for Encoding Feedback Signal

A difference between this embodiment and Embodiment 2 lies in a mapping solution between feedback signals and codewords. For the mapping solution of this embodiment, reference can be made to Table 1-16.

TABLE 1-16

Mapping Solution Between Feedback signals And Codewords

| | | Carrier 2 | | |
|---|---|---|---|---|
| Carrier 3 | Carrier 1 | DTX | NACK | ACK |
| DTX | DTX | * | D1 | C1 |
| | NACK | B1 | C2 | C5 |
| | ACK | A1 | A4 | D3 |
| NACK | DTX | A3 | A2 | C4 |
| | NACK | C2 | C2 | A5 |
| | ACK | D3 | B2 | B6 |
| ACK | DTX | B3 | B4 | D4 |
| | NACK | D4 | C3 | D6 |
| | ACK | B5 | A6 | C6 |

It can be seen from Table 1-16 that, the feedback signal D-N-D is mapped into D1; the feedback signal D-A-D is mapped into C1; the feedback signal N-D-D is mapped into B1; the feedback signal N-N-D is mapped into C2; the feedback signal N-A-D is mapped into C5; the feedback signal A-D-D is mapped into A1; the feedback signal A-N-D is mapped into A4; the feedback signal A-A-D is mapped into D3; the feedback signal D-D-N is mapped into A3; the feedback signal D-N-N is mapped into A2; the feedback signal D-A-N is mapped into C4; the feedback signal N-D-N is mapped into C2; the feedback signal N-N-N is mapped into C2; the feedback signal N-A-N is mapped into A5; the feedback signal A-D-N is mapped into D3; the feedback signal A-N-N is mapped into B2; the feedback signal A-A-N is mapped into B6; the feedback signal D-D-A is mapped into B3; the feedback signal D-N-A is mapped into B4; the feedback signal D-A-A is mapped into D4; the feedback signal N-D-A is mapped into D4; the feedback signal N-N-A is mapped into C3; the feedback signal N-A-A is mapped into D6; the feedback signal A-D-A is mapped into B5; the feedback signal A-N-A is mapped into A6; and the feedback signal A-A-A is mapped into C6.

Code distance relationships between codewords and mapping relationships between codewords and codeword values according to this embodiment may be the same as those in Embodiment 2, with reference to Tables 1-12 and 1-14.

Referring to Table 1-16, in this embodiment, also, some feedback signals are encoded with the same codeword, for example, the feedback signals N-N-D, N-D-N, and N-N-N are all encoded into C2. During decoding procedure, the Node B may select a decoding space according to a sending mode, and perform decoding procedure in the decoding space, so that when the sending mode is Modes 1 to 6, a codeword transmitted in this embodiment is capable of being correctly decoded; while when the sending mode is Mode 7, and the Node B decodes a feedback signal to obtain a codeword C2, it is decided that the feedback signal is N-N-N.

In this embodiment, 26 feedback signals are encoded with 24 codewords, and when the sending mode is Mode 7, a decoding error may occur to the Node B, for example, the feedback signal N-N-D or N-D-N of the UE is decoded into N-N-N, such that a bit error rate is affected. However, since fewer codewords are adopted, the entire system performance can be improved. In a scenario of a higher requirement of the system performance, this embodiment has good applicability.

This embodiment provides a method for encoding feedback signals of three carriers in TC mode. In this embodiment, a single code channel is applied, which not only reduces power overhead and improves system performance, but does not affect CM value.

Embodiment 5 of a Method for Encoding Feedback Signal

The method of this embodiment includes: encoding feedback signals of three carriers to output a bit sequence, and sending the bit sequence on a HS-DPCCH.

The encoding the feedback signals of the three carriers may specifically include: mapping the feedback signals of the three carriers into a codeword selected from a codebook. The codebook satisfies a particular code distance relationship, which may be acquired through computer searching or by using other methods. Under a condition that a certain requirement (such as compatibility) is satisfied, a principle of selecting a codebook is that the smallest code distance is maximized, and the number of the smallest code distances is minimized.

Specifically, the codebook selected in this embodiment includes 26 codewords in total, and these codewords are selected from the codebook comprising codewords A1 to A6, B1 to B6, C1 to C6, D1 to D6, E1, and F1. For code distance relationships between the codewords, reference can be made to Tables 1-12 and 1-17.

Further, for the mapping a feedback signal into a codeword selected from the codebook, reference can be made to Table 1-18.

TABLE 1-18

Mapping Solution Between Feedback Signals And Codewords

| Carrier 3 | Carrier 1 | Carrier 2 | | |
|---|---|---|---|---|
| | | DTX | NACK | ACK |
| DTX | DTX | * | D1 | C1 |
| | NACK | B1 | C2 | A2 |
| | ACK | A1 | B2 | D2 |
| NACK | DTX | B3 | E1 | C4 |
| | NACK | D3 | F1 | A5 |
| | ACK | D4 | A6 | B4 |
| ACK | DTX | A3 | C3 | D6 |
| | NACK | C5 | C6 | D5 |
| | ACK | B5 | A4 | B6 |

It can be seen from Table 1-18 that, in this embodiment, the feedback signal D-N-D is mapped into D1; the feedback signal D-A-D is mapped into C1; the feedback signal N-D-D is mapped into B1; the feedback signal N-N-D is mapped into C2; the feedback signal N-A-D is mapped into A2; the feedback signal A-D-D is mapped into A1; the feedback signal A-N-D is mapped into B2; the feedback signal A-A-D is mapped into D2; the feedback signal D-D-N is mapped into B3; the feedback signal D-N-N is mapped into E1; the feedback signal D-A-N is mapped into C4; the feedback signal N-D-N is mapped into D3; the feedback signal N-N-N is mapped into F1; the feedback signal N-A-N is mapped into A5; the feedback signal A-D-N is mapped into D4; the feedback signal A-N-N is mapped into A6; the feedback signal A-A-N is mapped into B4; the feedback signal D-D-A is mapped into A3; the feedback signal D-N-A is mapped into C3; the feedback signal D-A-A is mapped into D6; the feedback signal N-D-A is mapped into C5; the feedback signal N-N-A is mapped into C6; the feedback signal N-A-A is mapped into D5; the feedback signal A-D-A is mapped into B5; the feedback signal A-N-A is mapped into A4; and the feedback signal A-A-A is mapped into B6.

Still further, in this embodiment, codeword values corresponding to each codeword are provided, and the codeword values are bit sequences which may be referred to Table 1-19. As can be seen from Table 1-19, the codebook comprises the 26 codeword values with the smallest code distance of 3.

TABLE 1-19

Mapping Relationships Between Codewords And Bit Sequences

| Codeword | Bit sequence | | | | | | | | | |
|---|---|---|---|---|---|---|---|---|---|---|
| A1 | 1 | 1 | 1 | 1 | 1 | 1 | 1 | 1 | 1 | 1 |
| A2 | 0 | 0 | 1 | 1 | 0 | 0 | 1 | 1 | 0 | 0 |
| A3 | 1 | 1 | 0 | 0 | 0 | 1 | 1 | 0 | 0 | 0 |
| A4 | 1 | 0 | 0 | 1 | 0 | 0 | 0 | 0 | 1 | 1 |
| A5 | 0 | 1 | 0 | 0 | 1 | 0 | 0 | 1 | 1 | 0 |

TABLE 1-17

Code Distance Relationships Between Codewords

| | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 | E1 | F1 |
|---|---|---|---|---|---|---|---|---|---|---|---|---|---|---|---|---|---|---|---|---|---|---|---|---|---|---|
| E1 | 6 | 6 | 6 | 4 | 4 | 4 | 4 | 4 | 4 | 4 | 6 | 6 | 6 | 7 | 7 | 3 | 7 | 3 | 3 | 3 | 3 | 7 | 3 | 7 | 7 | 0 | 10 |
| F1 | 4 | 4 | 4 | 6 | 6 | 6 | 6 | 6 | 6 | 6 | 4 | 4 | 4 | 3 | 3 | 7 | 3 | 7 | 7 | 7 | 7 | 3 | 7 | 3 | 3 | 10 | 0 |

TABLE 1-19-continued

Mapping Relationships Between Codewords And Bit Sequences

| Codeword | Bit sequence | | | | | | | | | |
|---|---|---|---|---|---|---|---|---|---|---|
| A6 | 0 | 0 | 1 | 0 | 1 | 1 | 0 | 0 | 0 | 1 |
| B1 | 0 | 0 | 0 | 0 | 0 | 0 | 0 | 0 | 0 | 0 |
| B2 | 1 | 1 | 0 | 0 | 1 | 1 | 0 | 0 | 1 | 1 |
| B3 | 0 | 0 | 1 | 1 | 1 | 0 | 0 | 1 | 1 | 1 |
| B4 | 0 | 1 | 1 | 0 | 1 | 1 | 1 | 1 | 0 | 0 |
| B5 | 1 | 0 | 1 | 1 | 0 | 1 | 1 | 0 | 0 | 1 |
| B6 | 1 | 1 | 0 | 1 | 0 | 0 | 1 | 1 | 1 | 0 |
| C1 | 1 | 1 | 1 | 1 | 1 | 0 | 0 | 0 | 0 | 0 |
| C2 | 0 | 1 | 0 | 1 | 0 | 1 | 0 | 1 | 0 | 1 |
| C3 | 0 | 1 | 1 | 0 | 0 | 0 | 1 | 0 | 1 | 1 |
| C4 | 1 | 0 | 1 | 0 | 0 | 1 | 0 | 1 | 1 | 0 |
| C5 | 0 | 0 | 0 | 1 | 1 | 1 | 1 | 0 | 1 | 0 |
| C6 | 1 | 0 | 0 | 0 | 1 | 0 | 1 | 1 | 0 | 1 |
| D1 | 0 | 0 | 0 | 0 | 0 | 1 | 1 | 1 | 1 | 1 |
| D2 | 1 | 0 | 1 | 0 | 1 | 0 | 1 | 0 | 1 | 0 |
| D3 | 1 | 0 | 0 | 1 | 1 | 1 | 0 | 1 | 0 | 0 |
| D4 | 0 | 1 | 0 | 1 | 1 | 0 | 1 | 0 | 0 | 1 |
| D5 | 1 | 1 | 1 | 0 | 0 | 0 | 1 | 0 | 0 | 1 |
| D6 | 0 | 1 | 1 | 1 | 0 | 1 | 0 | 0 | 1 | 0 |
| E1 | 0 | 0 | 0 | 0 | 1 | 0 | 1 | 0 | 1 | 1 |
| F1 | 1 | 1 | 1 | 1 | 0 | 1 | 0 | 1 | 0 | 0 |

Table 1-19 is a specific example. The present invention is not limited to merely the mapping relationships shown in Table 1-19, and those mapping relationships obtained by performing simple transformation on the basis of Table 1-19 also falls within the scope of the present invention, such as random changing of a sequence between columns on the basis of Table 1-19, or negation of a certain column value.

This embodiment provides a method for encoding feedback signals of three carriers in TC mode. In this embodiment, a single code channel is applied, which not only reduces power overhead and improves system performance, but does not affect CM value.

Embodiment 6 of a Method for Encoding Feedback Signal

A difference between this embodiment and Embodiment 5 lies in a mapping solution between feedback signals and codewords. For the mapping solution of this embodiment, reference can be made to Table 1-20.

TABLE 1-20

Mapping Solution Between Feedback Signals And Codewords

| | | Carrier 2 | | |
|---|---|---|---|---|
| Carrier 3 | Carrier 1 | DTX | NACK | ACK |
| DTX | DTX | * | A2 | B2 |
| | NACK | B1 | E1 | D2 |
| | ACK | A1 | C5 | B4 |
| NACK | DTX | A3 | F1 | C1 |
| | NACK | C2 | C6 | D5 |
| | ACK | C4 | A6 | D3 |
| ACK | DTX | B3 | C3 | B6 |
| | NACK | B5 | D4 | A4 |
| | ACK | D6 | D1 | A5 |

It can be seen from Table 1-20 that, in this embodiment, the feedback signal D-N-D is mapped into A2; the feedback signal D-A-D is mapped into B2; the feedback signal N-D-D is mapped into B1; the feedback signal N-N-D is mapped into E1; the feedback signal N-A-D is mapped into D2; the feedback signal A-D-D is mapped into A1; the feedback signal A-N-D is mapped into C5; the feedback signal A-A-D is mapped into B4; the feedback signal D-D-N is mapped into A3; the feedback signal D-N-N is mapped into F1; the feedback signal D-A-N is mapped into C1; the feedback signal N-D-N is mapped into C2; the feedback signal N-N-N is mapped into C6; the feedback signal N-A-N is mapped into D5; the feedback signal A-D-N is mapped into C4; the feedback signal A-N-N is mapped into A6; the feedback signal A-A-N is mapped into D3; the feedback signal D-D-A is mapped into B3; the feedback signal D-N-A is mapped into C3; the feedback signal D-A-A is mapped into B6; the feedback signal N-D-A is mapped into B5; the feedback signal N-N-A is mapped into D4; the feedback signal N-A-A is mapped into A4; the feedback signal A-D-A is mapped into D6; the feedback signal A-N-A is mapped into D1; and the feedback signal A-A-A is mapped into A5.

Code distance relationships between codewords and mapping relationships between codewords and codeword values according to this embodiment may be the same as those in Embodiment 5 of the method for encoding feedback signal, with reference to Tables 1-12 and 1-17.

This embodiment provides a method for encoding feedback signals of three carriers in TC mode. In this embodiment, a single code channel is applied, which not only reduces power overhead and improves system performance, but does not affect CM value.

Embodiment 7 of a Method for Encoding Feedback Signal

The method of this embodiment includes: encoding feedback signals of three carriers to output a bit sequence, and transmitting the bit sequence on a HS-DPCCH.

The encoding the feedback signals of the three carriers may specifically include: mapping the feedback signals of the three carriers into a codeword selected from a codebook. The codebook satisfies a particular code distance relationship, which may be acquired through computer searching or by using other methods. Under a condition that a certain requirement (such as compatibility) is satisfied, a principle of selecting a codebook is that the smallest code distance is maximized, and the number of the smallest code distances is minimized.

Specifically, the codebook selected in this embodiment includes 26 codewords in total, and these codewords are selected from the codebook comprising codewords A1 to A6, B1 to B6, C1 to C6, D1 to D6, E1, and F1. For code distance relationships between the codewords, reference can be made to Table 1-21.

TABLE 1-21

Code Distance Relationships Between Codewords

| | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 | E2 | F2 |
|---|---|---|---|---|---|---|---|---|---|---|---|---|---|---|---|---|---|---|---|---|---|---|---|---|---|---|
| A1 | 0 | 6 | 6 | 6 | 6 | 6 | 10 | 4 | 4 | 4 | 4 | 4 | 5 | 5 | 5 | 5 | 5 | 5 | 5 | 5 | 5 | 5 | 5 | 5 | 7 | 3 |
| A2 | 6 | 0 | 6 | 6 | 6 | 6 | 4 | 10 | 4 | 4 | 4 | 4 | 5 | 5 | 5 | 5 | 5 | 5 | 5 | 5 | 5 | 5 | 5 | 5 | 5 | 5 |
| A3 | 6 | 6 | 0 | 6 | 6 | 6 | 4 | 4 | 10 | 4 | 4 | 4 | 5 | 5 | 5 | 5 | 5 | 5 | 5 | 5 | 5 | 5 | 5 | 5 | 5 | 5 |
| A4 | 6 | 6 | 6 | 0 | 6 | 6 | 4 | 4 | 4 | 10 | 4 | 4 | 5 | 5 | 5 | 5 | 5 | 5 | 5 | 5 | 5 | 5 | 5 | 5 | 3 | 7 |

TABLE 1-21-continued

Code Distance Relationships Between Codewords

|    | A1 | A2 | A3 | A4 | A5 | A6 | B1 | B2 | B3 | B4 | B5 | B6 | C1 | C2 | C3 | C4 | C5 | C6 | D1 | D2 | D3 | D4 | D5 | D6 | E2 | F2 |
|----|----|----|----|----|----|----|----|----|----|----|----|----|----|----|----|----|----|----|----|----|----|----|----|----|----|----|
| A5 | 6  | 6  | 6  | 6  | 0  | 6  | 4  | 4  | 4  | 4  | 10 | 4  | 5  | 5  | 5  | 5  | 5  | 5  | 5  | 5  | 5  | 5  | 5  | 5  | 7  | 3  |
| A6 | 6  | 6  | 6  | 6  | 6  | 0  | 4  | 4  | 4  | 4  | 4  | 10 | 5  | 5  | 5  | 5  | 5  | 5  | 5  | 5  | 5  | 5  | 5  | 5  | 3  | 7  |
| B1 | 10 | 4  | 4  | 4  | 4  | 4  | 0  | 6  | 6  | 6  | 6  | 6  | 5  | 5  | 5  | 5  | 5  | 5  | 5  | 5  | 5  | 5  | 5  | 5  | 3  | 7  |
| B2 | 4  | 10 | 4  | 4  | 4  | 4  | 6  | 0  | 6  | 6  | 6  | 6  | 5  | 5  | 5  | 5  | 5  | 5  | 5  | 5  | 5  | 5  | 5  | 5  | 5  | 5  |
| B3 | 4  | 4  | 10 | 4  | 4  | 4  | 6  | 6  | 0  | 6  | 6  | 6  | 5  | 5  | 5  | 5  | 5  | 5  | 5  | 5  | 5  | 5  | 5  | 5  | 5  | 5  |
| B4 | 4  | 4  | 4  | 10 | 4  | 4  | 6  | 6  | 6  | 0  | 6  | 6  | 5  | 5  | 5  | 5  | 5  | 5  | 5  | 5  | 5  | 5  | 5  | 5  | 7  | 3  |
| B5 | 4  | 4  | 4  | 4  | 10 | 4  | 6  | 6  | 6  | 6  | 0  | 6  | 5  | 5  | 5  | 5  | 5  | 5  | 5  | 5  | 5  | 5  | 5  | 5  | 3  | 7  |
| B6 | 4  | 4  | 4  | 4  | 4  | 10 | 6  | 6  | 6  | 6  | 6  | 0  | 5  | 5  | 5  | 5  | 5  | 5  | 5  | 5  | 5  | 5  | 5  | 5  | 7  | 3  |
| C1 | 5  | 5  | 5  | 5  | 5  | 5  | 5  | 5  | 5  | 5  | 5  | 5  | 0  | 6  | 6  | 6  | 6  | 6  | 10 | 4  | 4  | 4  | 4  | 4  | 6  | 4  |
| C2 | 5  | 5  | 5  | 5  | 5  | 5  | 5  | 5  | 5  | 5  | 5  | 5  | 6  | 0  | 6  | 6  | 6  | 6  | 4  | 10 | 4  | 4  | 4  | 4  | 2  | 8  |
| C3 | 5  | 5  | 5  | 5  | 5  | 5  | 5  | 5  | 5  | 5  | 5  | 5  | 6  | 6  | 0  | 6  | 6  | 6  | 4  | 4  | 10 | 4  | 4  | 4  | 6  | 4  |
| C4 | 5  | 5  | 5  | 5  | 5  | 5  | 5  | 5  | 5  | 5  | 5  | 5  | 6  | 6  | 6  | 0  | 6  | 6  | 4  | 4  | 4  | 10 | 4  | 4  | 6  | 4  |
| C5 | 5  | 5  | 5  | 5  | 5  | 5  | 5  | 5  | 5  | 5  | 5  | 5  | 6  | 6  | 6  | 6  | 0  | 6  | 4  | 4  | 4  | 4  | 10 | 4  | 4  | 6  |
| C6 | 5  | 5  | 5  | 5  | 5  | 5  | 5  | 5  | 5  | 5  | 5  | 5  | 6  | 6  | 6  | 6  | 6  | 0  | 4  | 4  | 4  | 4  | 4  | 10 | 6  | 4  |
| D1 | 5  | 5  | 5  | 5  | 5  | 5  | 5  | 5  | 5  | 5  | 5  | 5  | 10 | 4  | 4  | 4  | 4  | 4  | 0  | 6  | 6  | 6  | 6  | 6  | 4  | 6  |
| D2 | 5  | 5  | 5  | 5  | 5  | 5  | 5  | 5  | 5  | 5  | 5  | 5  | 4  | 10 | 4  | 4  | 4  | 4  | 6  | 0  | 6  | 6  | 6  | 6  | 8  | 2  |
| D3 | 5  | 5  | 5  | 5  | 5  | 5  | 5  | 5  | 5  | 5  | 5  | 5  | 4  | 4  | 10 | 4  | 4  | 4  | 6  | 6  | 0  | 6  | 6  | 6  | 4  | 6  |
| D4 | 5  | 5  | 5  | 5  | 5  | 5  | 5  | 5  | 5  | 5  | 5  | 5  | 4  | 4  | 4  | 10 | 4  | 4  | 6  | 6  | 6  | 0  | 6  | 6  | 4  | 6  |
| D5 | 5  | 5  | 5  | 5  | 5  | 5  | 5  | 5  | 5  | 5  | 5  | 5  | 4  | 4  | 4  | 4  | 10 | 4  | 6  | 6  | 6  | 6  | 0  | 6  | 6  | 4  |
| D6 | 5  | 5  | 5  | 5  | 5  | 5  | 5  | 5  | 5  | 5  | 5  | 5  | 4  | 4  | 4  | 4  | 4  | 10 | 6  | 6  | 6  | 6  | 6  | 0  | 4  | 6  |
| E2 | 7  | 5  | 5  | 3  | 7  | 3  | 3  | 5  | 5  | 7  | 3  | 7  | 6  | 2  | 6  | 6  | 4  | 6  | 4  | 8  | 4  | 4  | 6  | 4  | 0  | 10 |
| F2 | 3  | 5  | 5  | 7  | 3  | 7  | 7  | 5  | 5  | 3  | 7  | 3  | 4  | 8  | 4  | 4  | 6  | 4  | 6  | 2  | 6  | 6  | 4  | 6  | 10 | 0  |

Further, for the mapping a feedback signal into a codeword selected from the codebook, reference can be made to Table 1-22.

TABLE 1-22

Mapping Solution Between Feedback Signals And Codewords

| Carrier 3 | Carrier 1 | Carrier 2 | | |
|---|---|---|---|---|
| | | DTX | NACK | ACK |
| DTX | DTX | * | D1 | C1 |
|  | NACK | B1 | C2 | A2 |
|  | ACK | A1 | B2 | D2 |
| NACK | DTX | B6 | C5 | C6 |
|  | NACK | D4 | E2 | A3 |
|  | ACK | D3 | A5 | F2 |
| ACK | DTX | A6 | C4 | C3 |
|  | NACK | D5 | A4 | B5 |
|  | ACK | D6 | B3 | B4 |

It can be seen from Table 1-22 that, in this embodiment, the feedback signal D-N-D is mapped into D1; the feedback signal D-A-D is mapped into C1; the feedback signal N-D-D is mapped into B1; the feedback signal N-N-D is mapped into C2; the feedback signal N-A-D is mapped into A2; the feedback signal A-D-D is mapped into A1; the feedback signal A-N-D is mapped into B2; the feedback signal A-A-D is mapped into D2; the feedback signal D-D-N is mapped into B6; the feedback signal D-N-N is mapped into C5; the feedback signal D-A-N is mapped into C6; the feedback signal N-D-N is mapped into D4; the feedback signal N-N-N is mapped into E2; the feedback signal N-A-N is mapped into A3; the feedback signal A-D-N is mapped into D3; the feedback signal A-N-N is mapped into A5; the feedback signal A-A-N is mapped into F2; the feedback signal D-D-A is mapped into A6; the feedback signal D-N-A is mapped into C4; the feedback signal D-A-A is mapped into C3; the feedback signal N-D-A is mapped into D5; the feedback signal N-N-A is mapped into A4; the feedback signal N-A-A is mapped into B5; the feedback signal A-D-A is mapped into D6; the feedback signal A-N-A is mapped into B3; and the feedback signal A-A-A is mapped into B4.

Still further, in this embodiment, codeword values corresponding to each codeword are provided, and the codeword values are bit sequences which may be referred to Table 1-23. As can be seen from Table 1-23, the codebook comprises 26 codeword values.

TABLE 1-23

Mapping Relationships Between Codewords And Bit Sequences

| Codeword | Bit sequence | | | | | | | | | |
|---|---|---|---|---|---|---|---|---|---|---|
| A1 | 1 | 1 | 1 | 1 | 1 | 1 | 1 | 1 | 1 | 1 |
| A2 | 0 | 0 | 1 | 1 | 0 | 0 | 1 | 1 | 0 | 0 |
| A3 | 1 | 1 | 0 | 0 | 0 | 1 | 1 | 0 | 0 | 0 |
| A4 | 1 | 0 | 0 | 1 | 0 | 0 | 0 | 0 | 1 | 1 |
| A5 | 0 | 1 | 0 | 0 | 1 | 0 | 0 | 1 | 1 | 0 |
| A6 | 0 | 0 | 1 | 0 | 1 | 1 | 0 | 0 | 0 | 1 |
| B1 | 0 | 0 | 0 | 0 | 0 | 0 | 0 | 0 | 0 | 0 |
| B2 | 1 | 1 | 0 | 0 | 1 | 1 | 0 | 0 | 1 | 1 |
| B3 | 0 | 0 | 1 | 1 | 1 | 0 | 0 | 1 | 1 | 1 |
| B4 | 0 | 1 | 1 | 0 | 1 | 1 | 1 | 1 | 0 | 0 |
| B5 | 1 | 0 | 1 | 1 | 0 | 1 | 1 | 0 | 0 | 1 |
| B6 | 1 | 1 | 0 | 1 | 0 | 0 | 1 | 1 | 1 | 0 |
| C1 | 1 | 1 | 1 | 1 | 1 | 0 | 0 | 0 | 0 | 1 |
| C2 | 0 | 1 | 0 | 1 | 0 | 1 | 0 | 1 | 0 | 1 |
| C3 | 0 | 1 | 1 | 0 | 0 | 0 | 1 | 0 | 1 | 1 |
| C4 | 1 | 0 | 1 | 0 | 0 | 1 | 0 | 1 | 1 | 0 |
| C5 | 0 | 0 | 0 | 1 | 1 | 1 | 1 | 0 | 1 | 0 |
| C6 | 1 | 0 | 0 | 0 | 1 | 0 | 1 | 1 | 0 | 1 |
| D1 | 0 | 0 | 0 | 0 | 0 | 1 | 1 | 1 | 1 | 1 |
| D2 | 1 | 0 | 1 | 0 | 1 | 0 | 1 | 0 | 1 | 0 |
| D3 | 1 | 0 | 0 | 1 | 1 | 1 | 0 | 1 | 0 | 0 |
| D4 | 0 | 1 | 0 | 1 | 1 | 0 | 1 | 0 | 0 | 1 |
| D5 | 1 | 1 | 1 | 0 | 0 | 0 | 0 | 1 | 0 | 1 |
| D6 | 0 | 1 | 1 | 1 | 0 | 1 | 0 | 0 | 1 | 0 |
| E2 | 0 | 0 | 0 | 1 | 0 | 1 | 0 | 0 | 0 | 1 |
| F2 | 1 | 1 | 1 | 0 | 1 | 0 | 1 | 1 | 1 | 0 |

Table 1-23 is a specific example. The present invention is not limited to merely the mapping relationships shown in Table 1-23, and those mapping relationships obtained by performing simple transformation on the basis of Table 1-23 also falls within the scope of the present invention, such as random changing of a sequence between columns on the basis of Table 1-23, or negation of a certain column value.

This embodiment provides a method for encoding feedback signals of three carriers in TC mode. In this embodiment, a single code channel is applied, which not only reduces power overhead and improves system performance, but does not affect CM value.

In view of the foregoing, the present invention provides solutions for HARQ-ACK technology in TC mode. According to the foregoing description, the present invention is further applicable to double code channels, which solves HARQ-ACK feedback problems of 4 carriers, 5 carriers, and 6 carriers.

For ease of description, in the embodiments of the present invention, definitions of the following terms are specified as follows:

SC: an encoding solution for single-carrier, that is, the encoding solution corresponding to Table 1-1;

DC: an encoding solution for dual-carrier, that is, the encoding solution corresponding to Table 1-2;

TC: an encoding solution for ternary-carrier, that is, the encoding solution according to the present invention;

for 4 carriers: the TC encoding solution may be applied in a first code channel, and the SC encoding solution may be applied in a second code channel; for 5 carriers: the TC encoding solution may be applied in a first code channel, and the DC encoding solution may be applied in a second code channel; and for 6 carriers: the TC encoding solution may be applied in a first code channel, and the TC encoding solution may also be applied in a second code channel.

Embodiment 1 of an Apparatus for Encoding Feedback Signals

Figure 3:
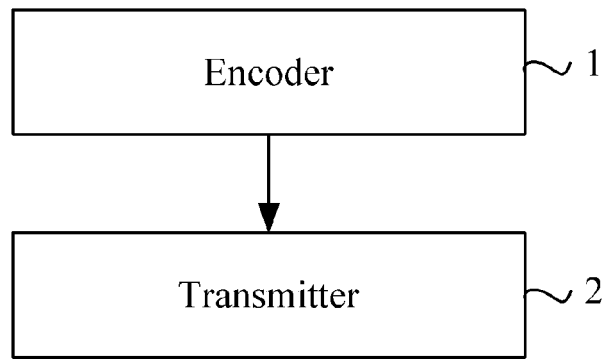
FIG. 3 is a schematic structure of an apparatus for encoding feedback signals according to further another embodiment of the present invention.

FIG. 3 is a schematic structure of an apparatus for encoding feedback signals according to Embodiment 1 of the present invention. As shown in FIG. 3, the apparatus includes an encoder 1 and a transmitter 2. The encoder 1 is configured to encode feedback signals of three carriers to output a bit sequence, and the transmitter 2 is configured to transmit the bit sequence on a HS-DPCCH.

In this embodiment, the encoder 1 is further configured to map the feedback signals of the three carriers into a codeword. The codeword is selected from the codebook comprising codewords G1 to G16 and H1 to H10. For code distance relationships between the codewords in the codebook, reference can be made to Table 1-9.

Specifically, in this embodiment, the encoder 1 may perform the encoding procedure according to the description in Embodiment 1 of method for encoding feedback signal aforementioned.

This embodiment provides an apparatus for encoding feedback signals of three carriers in TC mode. In this embodiment, a single code channel is applied, which not only reduces power overhead and improves system performance, but does not affect CM value.

Embodiment 2 of an Apparatus for Encoding Feedback Signals

The apparatus according to this embodiment may include an encoder and a transmitter. The encoder is configured to encode feedback signals of three carriers to output a bit sequence, and the transmitter is configured to transmit the bit sequence on a HS-DPCCH.

In this embodiment, the encoder is further configured to map the feedback signals of the three carriers into a codeword selected from a codebook. The codebook comprises codewords A1 to A6, B1 to B6, C1 to C6, and D1 to D6. For code distance relationships between the codewords, reference can be made to Table 1-12.

Specifically, in this embodiment, the encoder 1 may perform the encoding procedure according to the description in Embodiment 2 to Embodiment 4 of the method for encoding feedback signal aforementioned.

This embodiment provides an apparatus for encoding feedback signals of three carriers in TC mode. In this embodiment, a single code channel is applied, which not only reduces power overhead and improves system performance, but does not affect CM value.

Embodiment 3 of an Apparatus for Encoding Feedback Signals

The apparatus according to this embodiment may include an encoder and a transmitter. The encoder is configured to encode feedback signals of three carriers to output a bit sequence, and transmitter is configured to transmit the bit sequence on a HS-DPCCH.

In this embodiment, the encoder is further configured to map the feedback signals of the three carriers into a codeword selected from a codebook. The codebook comprises codewords A1 to A6, B1 to B6, C1 to C6, D1 to D6, E1, and F1. For code distance relationships between the codewords in the codebook, reference can be made to Table 1-17.

Specifically, in this embodiment, the encoder 1 may perform the encoding procedure according to the description in Embodiment 5 and Embodiment 6 of the method for encoding feedback signal.

This embodiment provides an apparatus for encoding feedback signals of three carriers in TC mode. In this embodiment, a single code channel is applied, which not only reduces power overhead and improves system performance, but does not affect CM value.

Embodiment 4 of an Apparatus for Encoding Feedback Signals

The apparatus according to this embodiment may include an encoder and a transmitter. The encoder is configured to encode feedback signals of three carriers to output a bit sequence, and the transmitter is configured to transmit the bit sequence on a HS-DPCCH.

In this embodiment, the encoder is configured to map the feedback signals of the three carriers into a codeword selected from a codebook. The codebook comprises codewords A1 to A6, B1 to B6, C1 to C6, D1 to D6, E1, and F1. For code distance relationships between the codewords in the codebook, reference can be made to Table 1-21.

Specifically, in this embodiment, encoder 1 may perform the encoding procedure according to the description in Embodiment 7 of the method encoding feedback signal.

This embodiment provides an apparatus for encoding feedback signals of three carriers in TC mode. In this embodiment, a single code channel is applied, which not only reduces power overhead and improves system performance, but does not affect CM value.

A Person skilled in the art may understand that all or part of the steps of the method according to the embodiments of the present invention may be implemented by a computer program code instructing hardware. The computer program code may be stored in a computer readable storage medium. When the computer program code runs in a computer unit, the steps of the method according to the embodiments of the present invention are performed. The storage medium may be any medium that is capable of storing program codes, such as a Read-Only Memory (ROM), a Random Access Memory (RAM), a magnetic disk, or an optical disk.

It should be noted that the above embodiments are merely provided for elaborating the technical solutions of the present invention, but not intended to limit the present invention. Although the present invention has been described in detail with reference to the foregoing embodiments, it is apparent that persons skilled in the art can make various modifications and variations to the invention without departing from the spirit and scope of the invention. The invention shall cover the modifications and variations provided that they fall within the scope of protection defined by the following claims or their equivalents.

What is claimed is:

1. A method of encoding feedback signals, comprising:
encoding feedback signals of three carriers to output a bit sequence; wherein encoding the feedback signals of the three carriers to output the bit sequence comprises:
mapping the feedback signals of the three carriers into the bit sequence according to a mapping relationship as shown in the following table:

| | | | | | | | | | | |
|---|---|---|---|---|---|---|---|---|---|---|
| ACK-DTX-DTX | 1 | 1 | 1 | 1 | 1 | 1 | 1 | 1 | 1 | 1 |
| NACK-DTX-DTX | 0 | 0 | 0 | 0 | 0 | 0 | 0 | 0 | 0 | 0 |
| DTX-ACK-DTX | 1 | 1 | 1 | 1 | 1 | 0 | 0 | 0 | 0 | 0 |
| DTX-NACK-DTX | 0 | 0 | 0 | 0 | 0 | 1 | 1 | 1 | 1 | 1 |
| DTX-DTX-ACK | 1 | 1 | 0 | 0 | 1 | 1 | 0 | 0 | 0 | 0 |
| DTX-DTX-NACK | 0 | 0 | 1 | 1 | 1 | 0 | 0 | 1 | 1 | 1 |
| ACK-ACK-DTX | 1 | 0 | 1 | 0 | 1 | 0 | 1 | 0 | 1 | 0 |
| ACK-NACK-DTX | 1 | 1 | 0 | 0 | 1 | 1 | 0 | 0 | 1 | 1 |
| NACK-ACK-DTX | 0 | 0 | 1 | 1 | 0 | 0 | 1 | 1 | 0 | 0 |
| NACK-NACK-DTX | 0 | 1 | 0 | 1 | 0 | 1 | 0 | 1 | 0 | 1 |
| ACK-DTX-ACK | 1 | 0 | 1 | 1 | 0 | 1 | 1 | 0 | 0 | 1 |
| ACK-DTX-NACK | 0 | 1 | 0 | 1 | 1 | 0 | 1 | 0 | 0 | 1 |
| NACK-DTX-ACK | 0 | 0 | 0 | 1 | 1 | 1 | 1 | 0 | 1 | 0 |
| NACK-DTX-NACK | 1 | 0 | 0 | 1 | 1 | 1 | 0 | 1 | 0 | 0 |
| DTX-ACK-ACK | 0 | 1 | 1 | 1 | 0 | 1 | 0 | 0 | 1 | 0 |
| DTX-ACK-NACK | 1 | 0 | 1 | 0 | 0 | 1 | 0 | 1 | 1 | 0 |
| DTX-NACK-ACK | 0 | 1 | 1 | 0 | 0 | 0 | 1 | 0 | 1 | 1 |
| DTX-NACK-NACK | 0 | 0 | 0 | 0 | 1 | 0 | 1 | 0 | 1 | 1 |
| ACK-ACK-ACK | 1 | 1 | 0 | 1 | 0 | 0 | 1 | 1 | 1 | 0 |
| ACK-ACK-NACK | 0 | 1 | 1 | 0 | 1 | 1 | 1 | 1 | 0 | 0 |
| ACK-NACK-ACK | 1 | 0 | 0 | 1 | 0 | 0 | 0 | 0 | 1 | 1 |
| ACK-NACK-NACK | 0 | 0 | 1 | 0 | 1 | 1 | 0 | 0 | 0 | 1 |
| NACK-ACK-ACK | 1 | 1 | 1 | 0 | 0 | 0 | 0 | 1 | 0 | 1 |
| NACK-ACK-NACK | 0 | 1 | 0 | 0 | 1 | 0 | 0 | 1 | 1 | 0 |
| NACK-NACK-ACK | 1 | 0 | 0 | 0 | 1 | 0 | 1 | 1 | 0 | 1 |
| NACK-NACK-NACK | 1 | 1 | 1 | 1 | 0 | 1 | 0 | 1 | 0 | 0 | wherein DTX represents discontinuous transmission, ACK represents acknowledgement, NACK represents negative acknowledgement.

2. The method of claim 1, further comprising:
sending the bit sequence on a High Speed-Dedicated Physical Control Channel (HS-DPCCH).

3. An apparatus for encoding feedback signals, comprising:
an encoder, configured to encode feedback signals of three carriers to output a bit sequence; wherein
the encoder is further configured to map the feedback signals of the three carriers into the bit sequence according to a mapping relationship as shown in the following table:

| | | | | | | | | | | |
|---|---|---|---|---|---|---|---|---|---|---|
| ACK-DTX-DTX | 1 | 1 | 1 | 1 | 1 | 1 | 1 | 1 | 1 | 1 |
| NACK-DTX-DTX | 0 | 0 | 0 | 0 | 0 | 0 | 0 | 0 | 0 | 0 |
| DTX-ACK-DTX | 1 | 1 | 1 | 1 | 1 | 0 | 0 | 0 | 0 | 0 |
| DTX-NACK-DTX | 0 | 0 | 0 | 0 | 0 | 1 | 1 | 1 | 1 | 1 |
| DTX-DTX-ACK | 1 | 1 | 0 | 0 | 1 | 1 | 0 | 0 | 0 | 0 |
| DTX-DTX-NACK | 0 | 0 | 1 | 1 | 1 | 0 | 0 | 1 | 1 | 1 |
| ACK-ACK-DTX | 1 | 0 | 1 | 0 | 1 | 0 | 1 | 0 | 1 | 0 |
| ACK-NACK-DTX | 1 | 1 | 0 | 0 | 1 | 1 | 0 | 0 | 1 | 1 |
| NACK-ACK-DTX | 0 | 0 | 1 | 1 | 0 | 0 | 1 | 1 | 0 | 0 |
| NACK-NACK-DTX | 0 | 1 | 0 | 1 | 0 | 1 | 0 | 1 | 0 | 1 |
| ACK-DTX-ACK | 1 | 0 | 1 | 1 | 0 | 1 | 1 | 0 | 0 | 1 |
| ACK-DTX-NACK | 0 | 1 | 0 | 1 | 1 | 0 | 1 | 0 | 0 | 1 |
| NACK-DTX-ACK | 0 | 0 | 0 | 1 | 1 | 1 | 1 | 0 | 1 | 0 |
| NACK-DTX-NACK | 1 | 0 | 0 | 1 | 1 | 1 | 0 | 1 | 0 | 0 |
| DTX-ACK-ACK | 0 | 1 | 1 | 1 | 0 | 1 | 0 | 0 | 1 | 0 |
| DTX-ACK-NACK | 1 | 0 | 1 | 0 | 0 | 1 | 0 | 1 | 1 | 0 |
| DTX-NACK-ACK | 0 | 1 | 1 | 0 | 0 | 0 | 1 | 0 | 1 | 1 |
| DTX-NACK-NACK | 0 | 0 | 0 | 0 | 1 | 0 | 1 | 0 | 1 | 1 |
| ACK-ACK-ACK | 1 | 1 | 0 | 1 | 0 | 0 | 1 | 1 | 1 | 0 |
| ACK-ACK-NACK | 0 | 1 | 1 | 0 | 1 | 1 | 1 | 1 | 0 | 0 |
| ACK-NACK-ACK | 1 | 0 | 0 | 1 | 0 | 0 | 0 | 0 | 1 | 1 |
| ACK-NACK-NACK | 0 | 0 | 1 | 0 | 1 | 1 | 0 | 0 | 0 | 1 |
| NACK-ACK-ACK | 1 | 1 | 1 | 0 | 0 | 0 | 0 | 1 | 0 | 1 |
| NACK-ACK-NACK | 0 | 1 | 0 | 0 | 1 | 0 | 0 | 1 | 1 | 0 |
| NACK-NACK-ACK | 1 | 0 | 0 | 0 | 1 | 0 | 1 | 1 | 0 | 1 |
| NACK-NACK-NACK | 1 | 1 | 1 | 1 | 0 | 1 | 0 | 1 | 0 | 0 | wherein DTX represents discontinuous transmission, ACK represents acknowledgement, NACK represents negative acknowledgement.

4. The apparatus of claim 3, further comprising:
a transmitter, configured to transmit the bit sequence on a High Speed-Dedicated Physical Control Channel (HS-DPCCH).

5. A computer readable medium, comprising:
a computer program code, which, when executed by a computer unit, will cause the computer unit to perform the step of encoding feedback signals of three carriers to output a bit sequence;
wherein encoding the feedback signals of the three carriers to output the bit sequence comprises:
mapping the feedback signals of the three carriers into the bit sequence according to a mapping relationship as shown in the following table:

| | | | | | | | | | | |
|---|---|---|---|---|---|---|---|---|---|---|
| ACK-DTX-DTX | 1 | 1 | 1 | 1 | 1 | 1 | 1 | 1 | 1 | 1 |
| NACK-DTX-DTX | 0 | 0 | 0 | 0 | 0 | 0 | 0 | 0 | 0 | 0 |
| DTX-ACK-DTX | 1 | 1 | 1 | 1 | 1 | 0 | 0 | 0 | 0 | 0 |
| DTX-NACK-DTX | 0 | 0 | 0 | 0 | 0 | 1 | 1 | 1 | 1 | 1 |
| DTX-DTX-ACK | 1 | 1 | 0 | 0 | 1 | 1 | 0 | 0 | 0 | 0 |
| DTX-DTX-NACK | 0 | 0 | 1 | 1 | 1 | 0 | 0 | 1 | 1 | 1 |
| ACK-ACK-DTX | 1 | 0 | 1 | 0 | 1 | 0 | 1 | 0 | 1 | 0 |
| ACK-NACK-DTX | 1 | 1 | 0 | 0 | 1 | 1 | 0 | 0 | 1 | 1 |
| NACK-ACK-DTX | 0 | 0 | 1 | 1 | 0 | 0 | 1 | 1 | 0 | 0 |
| NACK-NACK-DTX | 0 | 1 | 0 | 1 | 0 | 1 | 0 | 1 | 0 | 1 |
| ACK-DTX-ACK | 1 | 0 | 1 | 1 | 0 | 1 | 1 | 0 | 0 | 1 |
| ACK-DTX-NACK | 0 | 1 | 0 | 1 | 1 | 0 | 1 | 0 | 0 | 1 |
| NACK-DTX-ACK | 0 | 0 | 0 | 1 | 1 | 1 | 1 | 0 | 1 | 0 |
| NACK-DTX-NACK | 1 | 0 | 0 | 1 | 1 | 1 | 0 | 1 | 0 | 0 |
| DTX-ACK-ACK | 0 | 1 | 1 | 1 | 0 | 1 | 0 | 0 | 1 | 0 |
| DTX-ACK-NACK | 1 | 0 | 1 | 0 | 0 | 1 | 0 | 1 | 1 | 0 |
| DTX-NACK-ACK | 0 | 1 | 1 | 0 | 0 | 0 | 1 | 0 | 1 | 1 |
| DTX-NACK-NACK | 0 | 0 | 0 | 0 | 1 | 0 | 1 | 0 | 1 | 1 |
| ACK-ACK-ACK | 1 | 1 | 0 | 1 | 0 | 0 | 1 | 1 | 1 | 0 |
| ACK-ACK-NACK | 0 | 1 | 1 | 0 | 1 | 1 | 1 | 1 | 0 | 0 |
| ACK-NACK-ACK | 1 | 0 | 0 | 1 | 0 | 0 | 0 | 0 | 1 | 1 |
| ACK-NACK-NACK | 0 | 0 | 1 | 0 | 1 | 1 | 0 | 0 | 0 | 1 |
| NACK-ACK-ACK | 1 | 1 | 1 | 0 | 0 | 0 | 0 | 1 | 0 | 1 |
| NACK-ACK-NACK | 0 | 1 | 0 | 0 | 1 | 0 | 0 | 1 | 1 | 0 |
| NACK-NACK-ACK | 1 | 0 | 0 | 0 | 1 | 0 | 1 | 1 | 0 | 1 |
| NACK-NACK-NACK | 1 | 1 | 1 | 1 | 0 | 1 | 0 | 1 | 0 | 0 | wherein DTX represents discontinuous transmission, ACK represents acknowledgement, NACK represents negative acknowledgement.

6. The computer readable medium of claim 5, wherein
the computer program code, which, when executed by the computer unit, will cause the computer unit to perform a second step of sending the bit sequence on a High Speed-Dedicated Physical Control Channel (HS-DPCCH).

* * * * *